United States Patent
Krause et al.

(10) Patent No.: US 7,590,237 B2
(45) Date of Patent: Sep. 15, 2009

(54) TIME-MULTIPLEXED MULTI-PROGRAM ENCRYPTION SYSTEM

(75) Inventors: Edward A. Krause, San Mateo, CA (US); Peter Monta, Palo Alto, CA (US)

(73) Assignee: RGB Networks, Inc., Sunnyvale, CA (US)

( * ) Notice: Subject to any disclaimer, the term of this patent is extended or adjusted under 35 U.S.C. 154(b) by 807 days.

(21) Appl. No.: 11/094,865

(22) Filed: Mar. 31, 2005

(65) Prior Publication Data

US 2005/0180568 A1    Aug. 18, 2005

Related U.S. Application Data

(63) Continuation of application No. PCT/US2004/012485, filed on Apr. 21, 2004.
(60) Provisional application No. 60/464,376, filed on Apr. 21, 2003.

(51) Int. Cl.
*H04K 1/04* (2006.01)
*H04N 7/167* (2006.01)
*H04L 29/06* (2006.01)
*H04N 5/00* (2006.01)
*H04N 5/44* (2006.01)

(52) U.S. Cl. .................. 380/37; 380/212; 713/150
(58) Field of Classification Search .......... 380/37
See application file for complete search history.

(56) References Cited

U.S. PATENT DOCUMENTS 5,216,503 A    6/1993    Paik et al.

(Continued)

FOREIGN PATENT DOCUMENTS

EP    2026558 A1 *    2/2009

(Continued)

OTHER PUBLICATIONS

Swapna Dontharaju, Shenchih Tung, James T. Cain, Leonid Mats, Marlin H. Mickle, Alex K. Jones, "A design automation and power estimation flow for RFID systems", Jan. 2009, Transactions on Design Automation of Electronic Systems (TODAES), vol. 14 Issue 1, Publisher: ACM, pp. 1-31.*

(Continued)

*Primary Examiner*—Matthew B Smithers
*Assistant Examiner*—Courtney D Fields
(74) *Attorney, Agent, or Firm*—Lipsitz & McAllister, LLC

(57) ABSTRACT

A system and method are described for greatly increasing the number of services that can be encrypted with existing conditional access equipment. The method is most useful when many digitally compressed programs are encrypted at the same time. Only the most critical components of each compressed video, audio, or data stream are selected and then sequenced into a single stream. Additional formatting causes this sequence of segments from multiple sources to appear as a single continuous stream to the conditional access system. Once this stream has been encrypted, it is demultiplexed and the components are restored and re-sequenced into their respective programs. Messages such as the Entitlement Control Messages that are inserted into the stream by the encryption system, are also adjusted and included with each of the reconstructed programs. The technique not only allows encryption systems to be designed using less encryption hardware, but also simplifies the management of encryption sessions, particularly in on-demand programming applications.

20 Claims, 21 Drawing Sheets

U.S. PATENT DOCUMENTS

| | | | |
|---|---|---|---|
| 5,606,359 | A | 2/1997 | Youden et al. |
| 5,621,728 | A | 4/1997 | Lightfoot et al. |
| 5,732,068 | A | 3/1998 | Takahashi et al. |
| 5,825,829 | A | 10/1998 | Borazjani et al. |
| 5,844,890 | A | 12/1998 | Delp et al. |
| 5,862,140 | A | 1/1999 | Shen et al. |
| 5,892,535 | A | 4/1999 | Allen et al. |
| 5,917,830 | A | 6/1999 | Chen et al. |
| 5,926,205 | A | 7/1999 | Krause et al. |
| 5,973,722 | A | 10/1999 | Wakai et al. |
| 6,029,045 | A | 2/2000 | Picco et al. |
| 6,134,225 | A | 10/2000 | Pham et al. |
| 6,137,493 | A | 10/2000 | Kamimura et al. |
| 6,141,693 | A | 10/2000 | Perlman et al. |
| 6,215,767 | B1 | 4/2001 | Li |
| 6,229,895 | B1 | 5/2001 | Son et al. |
| 6,317,409 | B1 | 11/2001 | Murakami |
| 6,430,228 | B1 | 8/2002 | Zhang |
| 6,434,141 | B1 | 8/2002 | Oz et al. |
| 6,434,197 | B1 | 8/2002 | Wang et al. |
| 6,452,924 | B1 | 9/2002 | Golden et al. |
| 6,490,250 | B1 | 12/2002 | Hinchley et al. |
| 6,510,519 | B2 | 1/2003 | Wasilewski et al. |
| 6,546,055 | B1 | 4/2003 | Schmidel et al. |
| 6,578,201 | B1 | 6/2003 | LaRocca et al. |
| 6,590,871 | B1 | 7/2003 | Adachi |
| 6,678,318 | B1 | 1/2004 | Lai |
| 6,687,307 | B1 | 2/2004 | Anikhindi et al. |
| 6,728,270 | B1 | 4/2004 | Meggers et al. |
| 6,754,241 | B1 | 6/2004 | Krishnamurthy et al. |
| 6,871,011 | B1 | 3/2005 | Rahman et al. |
| 6,898,285 | B1 * | 5/2005 | Hutchings et al. ........... 380/200 |
| 6,904,610 | B1 | 6/2005 | Bayrakeri et al. |
| 6,928,120 | B1 | 8/2005 | Zhang |
| 6,934,965 | B2 | 8/2005 | Gordon et al. |
| 6,954,505 | B2 | 10/2005 | Gatherer et al. |
| 6,996,129 | B2 | 2/2006 | Krause et al. |
| 7,124,424 | B2 | 10/2006 | Gordon et al. |
| 7,146,628 | B1 | 12/2006 | Gordon et al. |
| 7,242,773 | B2 | 7/2007 | Candelore |
| 2001/0009574 | A1 | 7/2001 | Iemura |
| 2002/0059623 | A1 | 5/2002 | Rodriguez et al. |
| 2002/0078440 | A1 | 6/2002 | Feinberg et al. |
| 2002/0080887 | A1 | 6/2002 | Jeong et al. |
| 2002/0122387 | A1 | 9/2002 | Ni |
| 2002/0150115 | A1 | 10/2002 | Onvural et al. |
| 2002/0165983 | A1 | 11/2002 | Gastaldi |
| 2002/0196850 | A1 | 12/2002 | Liu et al. |
| 2003/0118134 | A1 | 6/2003 | Harris |
| 2003/0142689 | A1 | 7/2003 | Haberman et al. |
| 2003/0182429 | A1 | 9/2003 | Jagels |
| 2003/0219026 | A1 | 11/2003 | Sun et al. |
| 2003/0233464 | A1 | 12/2003 | Walpole et al. |
| 2004/0081205 | A1 | 4/2004 | Coulson |
| 2004/0258174 | A1 | 12/2004 | Shao et al. |
| 2005/0169395 | A1 | 8/2005 | Monta |
| 2005/0289619 | A1 | 12/2005 | Melby |
| 2008/0025389 | A1 | 1/2008 | Markman et al. |

FOREIGN PATENT DOCUMENTS

| | | |
|---|---|---|
| WO | 2004/079978 | 9/2004 |
| WO | 2004/095793 | 11/2004 |
| WO | WO 2004/095825 | 11/2004 |
| WO | 2005/022795 | 3/2005 |
| WO | 2005/022796 | 3/2005 |
| WO | 2005/022892 | 3/2005 |

OTHER PUBLICATIONS

Hairuo Ma, Magda El Zarki; A New Transport Protocol for Broadcasting/Multicating MPEG-2 Video Over Wireless ATM Access Networks, Jul. 2002, Wireless Networks, vol. 8 Issue 4, pp. 371-380.

Peter Schojer, et al., Architecture of a Quality Based Intelligent Proxy (QBIX) for MPEG-4 Videos, May 2003, Proceedings of the $12^{th}$ international conference on World Wide Web, pp. 394-402.

John L. Hennessy et al., Computer Architecture: A Quantitative Approach, Third Edition, Ch. 5., Morgan Kaufmann, Hardcover, $3^{rd}$ edition, Published May 2002, 1100 pages, ISBN 1558605967, pp. 460-489.

Yao ZuoHua, "The Application of the Scrambling and Descrambling System", Community Antenna Television of China, the 2nd period, 2001 (2 pages).

* cited by examiner

TIME-MULTIPLEXED MULTI-PROGRAM ENCRYPTION SYSTEM

CROSS-REFERENCE TO RELATED APPLICATIONS

This application claims the benefit of U.S. Provisional Patent Application No. 60/464,376 filed on Apr. 21, 2003, which is incorporated herein by reference.

This application is a continuation of the application PCT/2004/012485 filed on Apr. 21, 2004, which is incorporated herein by reference.

TECHNICAL FIELD OF THE INVENTION

The present invention relates to digital television systems, and more particularly to conditional access (CA) systems for controlling access to digital television program content.

BACKGROUND

Television signals are commonly delivered to the home using distribution systems based on coaxial cable, twisted-pair telephone wires, optical fiber, or wireless terrestrial or satellite transmissions. In many cases, programming is made available at no cost to the viewer, and instead the content providers and the content distributors are indirectly compensated based on revenues raised from advertising. In other cases, content is made available without advertisements, and in such cases, compensation is based on alternative sources of funding such as donations, or subscription and pay-per-view fees that are paid by the viewer. Today, viewer fees are usually charged for premium programming, however, in the future, fees may also be charged for general programming if such content can be delivered on-demand.

The delivery of on-demand programming is controlled by the viewer. Specifically, the viewer may be provided with the ability to select a program, begin playback at any time, pause and resume playback, reverse the direction of playback, speed up and slow down playback, or jump to any desired location in the program. One consequence of offering on-demand programming is that it enables the viewer to avoid viewing the advertisements that may have been inserted into a program, either by increasing the playback rate or jumping further forward into the program. This can become problematic if relatively large numbers of viewers are equipped with on-demand capabilities and the content owners are deriving their compensation from revenues that originate from the advertisers. Possible solutions to this potential problem include imposing restrictions on the level of control that is made available to the viewer, switching to a targeted or addressable advertising model which may be better tuned to the interests of each particular viewer, or levying a fee on the viewer in return for programming that is advertisement free.

Any time a fee is charged to the public, either to receive premium content, or to receive programming on-demand, it is important to provide mechanisms to prevent unauthorized access to content delivered over publicly accessible infrastructure. Access control is also important to limit the viewing of content that is confidential, sensitive in nature, or deemed unsuitable for the general public for other reasons. The solution that has been adopted by the television industry is to deploy Conditional Access (CA) systems. Most CA systems use digital encryption and are based on ciphers that encode and "randomize" the video and audio signals. Such randomized signals can be restored only through the application of special keys to the cipher modules. Such keys are usually protected and/or encrypted using ciphers that are even more secure than those applied to the signal itself. Typically, such encrypted keys are embedded into the television signal in messages known as ECMs (Entitlement Control Messages). During the presentation of a program, the keys are often changed on a regular basis and are only decodable once a viewer has been granted access to the encrypted program or to a programming class that is associated with a particular encrypted program. Such classes of programs are known as encryption tiers. Individual viewers can be granted access to selected encryption tiers through the use of messages known as EMMs (Entitlement Management Messages). EMMs are transmitted on a relatively infrequent basis, or whenever a change in entitlement occurs, and may be decodable only by the intended viewer. The EMMs include the information that is needed to interpret the ECMs corresponding to one or more encryption tiers.

Encryption equipment for television signals is deployed in cable head-ends, satellite uplink centers, and other sites where television signals are distributed. Such equipment is manufactured and maintained by a relatively small number of vendors, and is usually based on closely guarded proprietary technology. This protection of information helps to insure that a system is not compromised and continues to resist unauthorized attempts to access encrypted programming. Unfortunately, by limiting the number of vendors that have access to this market, it becomes more difficult to introduce technological innovations and a barrier is created for new entrants seeking to enter this market with more efficient products. For instance, hardware in a cable head-end may include satellite demodulation and decryption systems, video servers, multiplexers, transcoders, encryptors, and modulators. The ability to deliver on-demand capabilities at a cost that the head-end operator can afford depends on the ability of vendors to offer such equipment at prices that are significantly lower than they are today. Unfortunately, this may not be possible if the cost of the encryption and decryption components remains high, or if these components continue to be manufactured in low density enclosures and are not integrated with other head-end equipment.

SUMMARY OF THE INVENTION

The present inventive technique permits an order of magnitude increase in the number of video and audio signals that can be processed by existing encryption systems. The invention uses a recent technology, sometimes referred to as partial encryption, which is particularly well suited for highly compressed digital content such as video and audio entertainment programming. Partial encryption was developed as a means to support more than one encryption format in a television distribution system. It is a process where a relatively small component of a signal is first identified and then replicated one or more times. Each replication is then encrypted using a different encryption process, and each encrypted version is combined with the unencrypted portion of the original signal and then broadcasted to multiple receivers. Each receiver is assumed to be compatible with only one of the encryption processes. The receiver therefore identifies and decrypts the compatible version of the replicated components and then reconstructs the original signal by combining this result with the unencrypted component.

If a particular receiver is unauthorized or not compatible with any of the encryption systems, then it will only be able to decode the component of the signal that is transmitted in the clear (unencrypted). However, if the signal is highly compressed, then it is unlikely that a usable signal will be recoverable even if the missing component is very small. Recoverability is even further complicated if the encrypted packets were critically selected. That is, by choosing to encrypt only the most critical components of a particular compressed signal, such as the headers which provide crucial compression parameters or the key words that are essential for synchronizing with the compressed bit stream, it is possible to ensure that the received signal will be completely unintelligible even if less than 1% of the signal is encrypted.

This invention uses similar techniques to identify a component of a program that is to be encrypted. However, instead of broadcasting multiple encrypted versions of the same selected component of a program, the invention can be used to greatly increase the throughput of a single encryption system. The method is primarily applicable to applications where many programs are encrypted at the same time. Generally, it is possible to select a relatively small component from each program and then sequence the selected components in order to form a single stream. Additional formatting allows this stream to appear as a single program to the encryption system. Once the stream is encrypted, it is demultiplexed and the components are restored and re-sequenced into their respective programs. Messages such as the ECMs that are inserted into the stream by the encryption system are also adjusted and included with each of the demultiplexed programs.

This invention can also be used to perform high speed encryption when content can be provided faster than real time. Critical packets are selected from one or more programs and sequenced into a single stream as before. The resulting stream can then be encrypted at the maximum throughput of an existing single-channel encryption system, yielding a speedup factor equal to the ratio of this maximum throughput to the average rate of the stream comprised of critical packets. Finally the encrypted stream components are demultiplexed and re-sequenced with the unencrypted components.

This method for increasing the throughput of the encryption system can be used when multiple programs are presented under a common tier of encryption. Examples of television programs that can be grouped under a common tier are broadcast channels originating from the same provider (such as HBO), a new release movie that is being presented on-demand to many viewers at the same time, or any block of content that is provided on-demand to viewers that have signed up for the same subscription.

Another advantage of this solution is that it simplifies the management of the encryption sessions, particularly in on-demand applications. For example, an encryption session may begin when a viewer purchases the rights to view a particular program and end after a fixed interval transpires. Typically, the authorization must be adjusted and synchronized at both the receiver where the decryption is performed, and at the cable head-end or other site where the encryption system resides. However, when using multiplexed encryption, the tiers can be created in advance, and remain relatively static thereafter. When multiple viewers select similar content, they are simply assigned to the same tier and are granted time-multiplexed access to a single encryption channel (or service). In this case, only the critical components of each program are encrypted. In fact, the threshold used to determine if a segment is critical or non-critical can be varied as a function of the amount of traffic within a corresponding encryption channel. In this way it is possible to ensure that the available encryption resources are never exceeded. For example, as more and more viewers continue to be assigned to the same encryption channel, the observed channel throughput may begin to exceed the limits of the encryption system. To prevent this, the amount of traffic can be reduced by raising the threshold used to distinguish the critical and non-critical components. If the threshold continues to increase and eventually begins to exceed a comfortable limit, then security can be improved by assigning an additional encryption channel to service the same tier and by transitioning some of the viewers from the first encryption channel to the second. This transition can be implemented seamlessly and without disrupting service to the viewer. Similarly, if the number of viewers continues to increase and this again causes the critical component threshold to exceed a comfortable limit, then a third encryption channel can be assigned. Alternatively, if the number of viewers decreases, then one of the encryption channels can be disassociated with the tier by transitioning the viewers to the other encryption channel. The disassociated encryption channel can then be reassigned to another tier as needed.

According to an aspect of the invention, a system for time multiplexed, multi-program encryption of the type describe above comprises at least one receiver, at least one conditional access unit and at least one multiplex unit. The receiver receives and decodes at least one multiplex stream. The conditional access unit is a conventional CA unit for encrypting one or more streams. The multiplex unit identifies and selects "critical" packets for encryption from one or more multi-program multiplex streams, combines them into a single stream, tagging and reformatting packet headers as necessary, and directs the single stream through a conditional access unit to produce an encrypted stream. Packets are separated according to their tag values. The tag values identify the program from which the packets were taken and their position in the program stream. The multiplexer then replaces unencrypted program packets with encrypted program packets and transmits the multiplex stream, typically through a modulator onto a single cable channel.

According to an aspect of the invention, unencrypted critical packets can be transmitted in place of encrypted critical packets in the event of an encryption delay or failure. When this happens, it is possible that the encrypted packet may arrive "late", i.e., after the corresponding unencrypted packet has already been transmitted. In this case, the encrypted packet is discarded. If an encrypted packet arrives and no association can be established between the encrypted packet and a corresponding unencrypted packet, the encrypted packet is discarded.

According to another aspect of the invention, a single ECM can be shared among multiple programs in the same encryption tier when the programs are all combined into a single multiplex stream.

According to another aspect of the invention, critical packet selection rates can be monitored and compared against system encryption capacity for a given encryption tier. If the rate of critical packet generation is too high (e.g., above a predetermined "comfort level"), the critical packet selection criteria can be altered to reduce the rate of critical packet identification. Conversely, if the rate of critical packet selection is too low, packet selection criteria can be altered to increase the rate of critical packet selection.

Other aspects of the present invention are directed towards transitioning critical packets from multiple programs in the same encryption tier between multiple encryption channels active on the same encryption tier.

According to one aspect of the invention, when critical packet generation rates are excessively high, one or more additional encryption channels can be activated at the same encryption tier and critical packets from selected programs on the same encryption tier can be reallocated to the additional channel(s).

According to another aspect of the invention, when critical packet generation rates are low and there are two or more encryption channels active on the same encryption tier, programs from one or more of the encryption channels can be transitioned to other channels, thereby freeing up encryption channels for reallocation to another encryption tier.

According to another aspect of the invention, critical packet selection criteria for two or more channels active on the same encryption tier can be adjusted to balance utilization of the active channels.

BRIEF DESCRIPTION OF THE DRAWINGS

These and further features of the present invention will be apparent with reference to the following description and drawing, wherein.

DETAILED DESCRIPTION OF THE INVENTION

The present inventive technique improves utilization and throughput of digital television encryption hardware by separating one or more program streams into "critical" portions that will be encrypted and "non-critical" portions that will be transmitted "in the clear" (i.e., without encryption). This technique can work with existing CA systems, receivers, modulators, demodulators, etc., without modification of those devices.

Reference is made in the ensuing discussion described to the MPEG packet transport protocol as specified in ISO document 138180-1, "Generic Coding of Moving Pictures and Associated Audio Information: Systems" (hereinafter "MPEG Standard") and applicable to various video, audio, and data representations. Also, US Patent Application Publication Number US2003/0026423 by Unger and Candelore, "Critical Packet Partial Encryption" (hereinafter "UNGER"), and US Patent Application Publication Number US2003/0021412 by Candelore, Unger and Pedlow, "Partial Encryption and PID Mapping" (hereinafter CANDELORE) are useful in the context of the present inventive technique as examples of techniques for identifying "critical" packets.

Figure 1:
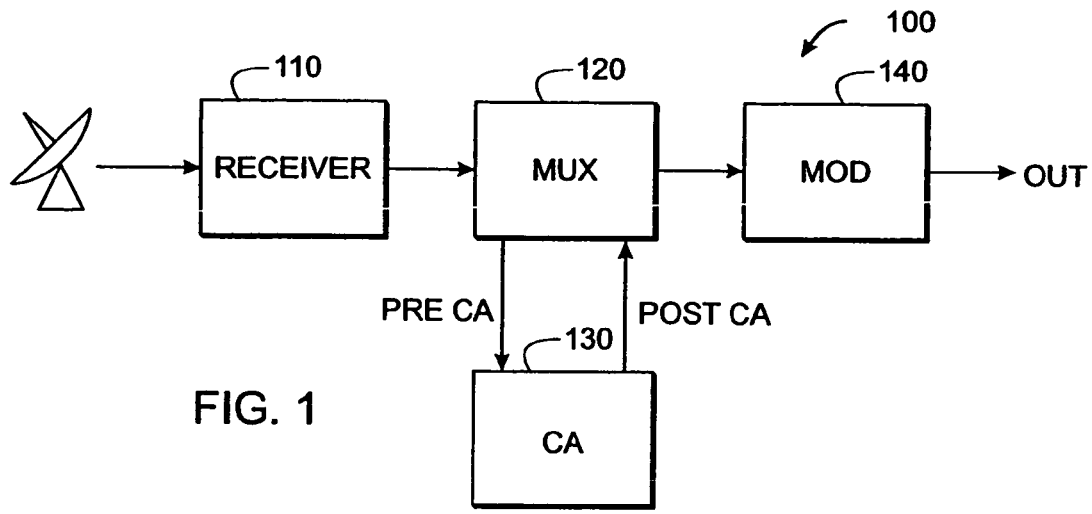
FIG. 1 is a block diagram of a time-multiplexed, multi-program encryption system, in accordance with the invention.

FIG. 1 is a block diagram of one embodiment of a time-multiplexed, multi-program encryption system 100, according to the invention. In FIG. 1, one or more receivers 110 (e.g., one or more satellite receivers) receives one or more multiplex signals (known as multiplexes). A "multiplex signal" or "multiplex" is a transmission containing one or more video programs. The multiplex(es) received by the receiver(s) 110 is (are) provided to a multiplexer 120. The multiplexer 120 allows selected programs to be recombined into new multiplexes, each optimized for distribution over a single channel of a cable system. The new multiplexes may include different programs or combinations of programs than those contained in the multiplexes received by the receiver(s) 110. The multiplexer 120 ensures that the output signals are compatible with the cable receivers in the home, that each program is delivered without exceeding the buffering capacity of the cable receivers, and that each program is delivered in time for real-time presentation. Depending on the bandwidth of the cable transmission channel, the number of programs to be multiplexed, and the instantaneous data rate of each program, it may be necessary to pad the multiplex with null or "dummy" packets in order to increase the multiplex data rate during certain intervals, or that one or more programs be modified in order to reduce the data rate of the multiplex during other intervals. Certain multiplexers 120 may also be capable of switching the sources corresponding to each signal in the output multiplex, such that the transition from one program to the next appears as seamless as a typical scene change. In the embodiment shown in FIG. 1, the fully formed, re-combined multiplexes are provided from the multiplexer 120 to a modulator 140, which implements a modulation process and upconversion process to produce a modulated signal (OUT) at a desired transmission frequency.

The multiplexer 120 of FIG. 1 implements the present inventive time-multiplexed, multi-program encryption technique. That is, for each program, the multiplexer selects the packets that are to be encrypted, assigns the selected packets into groups where each group is representative of a single conditional access tier, and formats and presents each group (PRE CA) to a CA (Conditional Access) module 130. Each group is sequenced into a single stream of packets for encryption. When the encrypted packets are returned from the CA module 130 (POST CA) to the multiplexer 120 in encrypted form, each stream is ungrouped and the encrypted packets are re-inserted into their original sequence and format within their respective programs.

Figure 2:
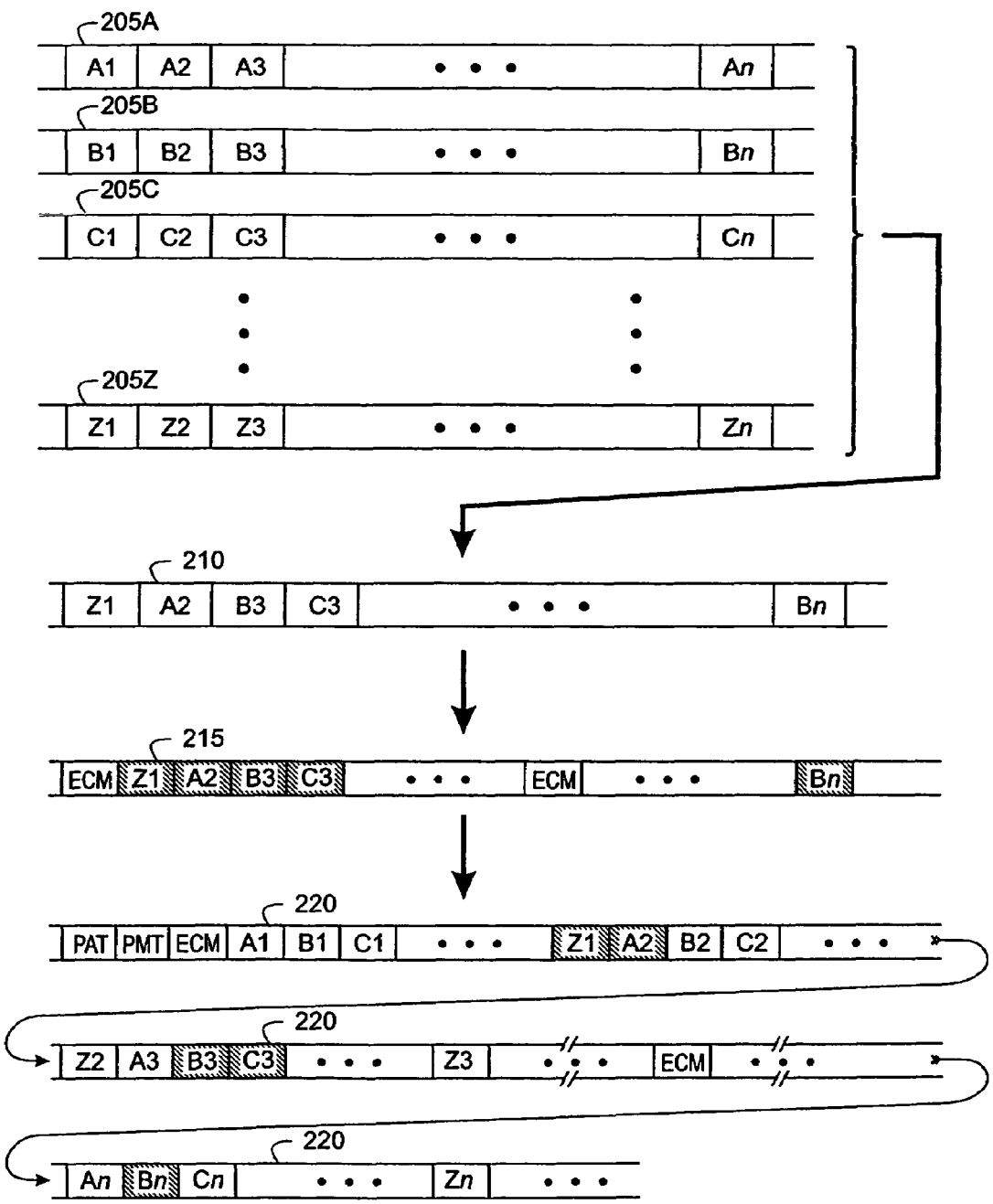
FIG. 2 is a diagram illustrating packet flow through a time-multiplexed, multi-program encryption system, in accordance with the invention.

FIG. 2 is a diagram illustrating the flow of packets within the system 100 of FIG. 1. In FIG. 2, packets are selected from a set of demultiplexed streams 205A, 205B, 205C, . . . , 205Z to produce a pre-encryption (PRE-CA) stream 210. The pre-encryption stream is then encrypted (e.g., by CA system 130, FIG. 1) to produce a post-encryption (POST-CA) stream 215. Encrypted packets from the post encryption stream 215 are then re-inserted into an output stream 220 in their "original" positions. In FIG. 2, shading indicates encryption. Heavy arrows indicate the overall direction of progress through the multiplexing process.

FIG. 2 shows a set of de-multiplexed streams 205A, 205B, 205C, . . . 205Z (e.g, flowing into the multiplexer 120 from the receiver 110). Each de-multiplexed stream 205$x$ includes a plurality of packets in a temporal sequence. Stream 205A includes packets A1, A2, A3, . . . An, stream 205B includes packets B1, B2, B3, . . . Bn, stream 205C includes packets C1, C2, C3, . . . Cn, and stream 205Z includes packets Z1, Z1, Z3, . . . Zn. A subset of the packets in the streams 205A,B, C, . . . Z are identified and are selected for encryption. The selected packets (Z1, A2, B3, C3, Bn) are assembled into a pre-encryption (PRE-CA) stream 210 to by encrypted (e.g., by the CA system 130 ). The CA system encrypts the pre-encryption stream and adds Entitlement Control Messages (ECMs) to produce a post-encryption (POST-CA) stream 215. Finally, a multiplexed stream 220 is formed by combining the unencrypted packets from the demultiplexed streams 205 into a simple interleaved sequence (A1, B1, C1, . . . Z1; A2, B2, C2, . . . Z2, etc.), inserting the encrypted packets in place of their unencrypted counterparts and inserting the ECM messages to form the multiplexed stream 220. In this particular example, the simple interleaved multiplexing strategy relies on an assumption that each of the input streams has been encoded at the same fixed rate. Those of ordinary skill in the art will immediately understand that if the de-multiplexed streams (205$x$) are encoded at different rates, a different multiplexing strategy would be employed.

Additional messages, known as the Program Association Table (PAT) and the Program Map Table (PMT) are created during the multiplexing process, according to the MPEG standard. These messages are inserted into the stream at regular intervals. The PAT packets are identified by a PID (Packet Identifier) which is always 0. For each program, the PAT specifies the PID of a corresponding PMT, and each PMT specifies the PIDs corresponding to each video, audio, and data stream associated with a particular program. In addition, special descriptors in the PMT are typically used to identify the PID of the ECM packets that are needed to decrypt the program. In this case, since each stream has been encrypted under a single tier, and since each stream is included in the same output multiplex, a single copy of each ECM can be shared. This sharing is implemented by setting the appropriate descriptor within the PMT corresponding to each of the programs in order to reference the same ECM PID. Alternatively, if a plurality of programs are encrypted under a single tier and if the programs are subsequently split into two or more multiplexes, each transmitted over a different communications channel, then the ECM messages must be duplicated and included in each of the output multiplexes. The PID assigned to the ECM packets can be changed as long as there is a matching correspondence with the descriptors that are contained within the PMT packets.

It is advantageous to group programs encrypted under a common tier into the same multiplex, as this can reduce the amount of ECM packet overhead. It is important, however, to maintain ECM sequence integrity relative to the encrypted packets. Most encryption systems rotate encryption keys periodically to provide a high level of protection against unauthorized viewing. The ECMs define these keys. If encrypted packets are re-sequenced relative to the position of the ECM packets in a multiplex, then this can cause the receiver to use the wrong key to decrypt out-of-sequence encrypted packets. This problem is more likely to occur if critical packets are delayed rather than advanced since updated keys are usually sent well before they are needed.

To provide a useful example, it is assumed that the output of the CA module includes an encrypted critical packet followed shortly after by an ECM packet, and that the multiplexer delays the critical packet and causes the ECM to be transmitted first. If this particular ECM carries an updated key and if this key can be extracted at the receiver before the critical packet arrives and used to replace the key that was intended to be used with the critical packet, then the receiver will be unable to decrypt the packet and an error will result. To prevent this type of error, the multiplexer only needs to insure that the sequence of ECM packets is preserved relative to the sequence of the data packets. If the ECMs apply to a single program, then this constraint is easily folded in with the requirement that the data packets not be sent out of order. However, if the same ECMs are to be applied to multiple programs, then such a constraint can impact the performance of multiplexers which seek to maximize channel efficiency. Therefore, in such cases, it may be preferable to replicate the ECM packets even if they are to be included in the same multiplex. In this case, each replicated packet should be assigned a different PID and this PID should be properly reflected in each corresponding PMT.

The organization of the functional blocks shown in FIG. 1 can be adjusted in order to accommodate certain equipment that is common in today's cable systems. For example, some CA modules are integrated with a modulator. In other CA systems, an integrated receiver/CA system is employed.

Figure 3:
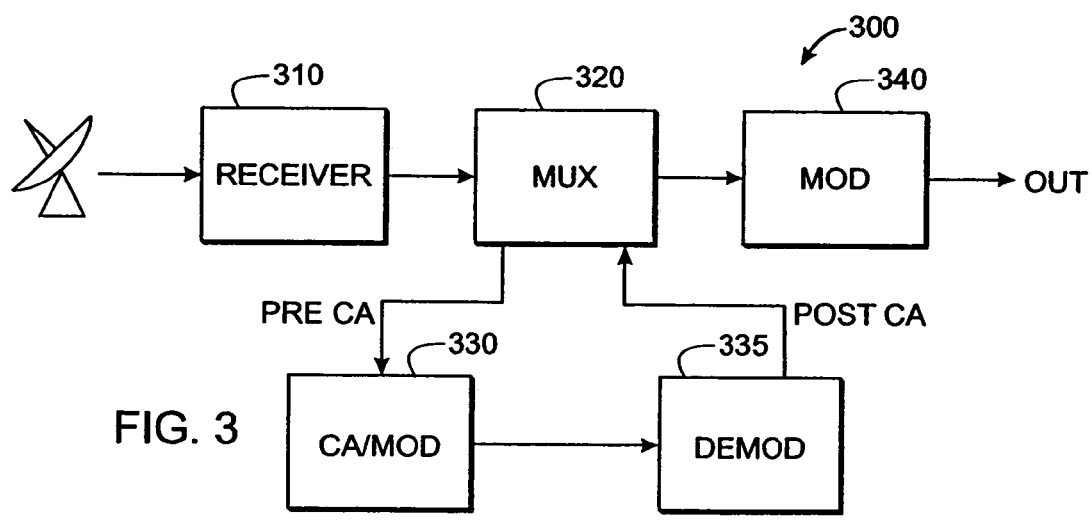
FIG. 3 is a block diagram of a time-multiplexed, multi-program encryption system, employing an integrated CA system/modulator, in accordance with the invention.

FIG. 3 is a block diagram of a time-multiplexed, multi-program encryption system 300 employing a combined CA system/modulator 330. Like the system 100 of FIG. 1, the system 300 receives one or more multiplex streams via a receiver 310 (compare 110). Multiplexer 320 and modulator 340 are substantially identical to their functional counterparts in FIG. 1 (see 120, 140, respectively). Since the combined CA/modulator 330 produces a modulated output, a demodulator 335 is inserted between the CA/modulator 330 and the multiplexer 320 to downconvert the modulated output of the CA/modulator 330 into an unmodulated POST-CA form, similar to the unmodulated PRE-CA signal presented to the CA/Modulator 330 by the Multiplexer 320.

Figure 4:
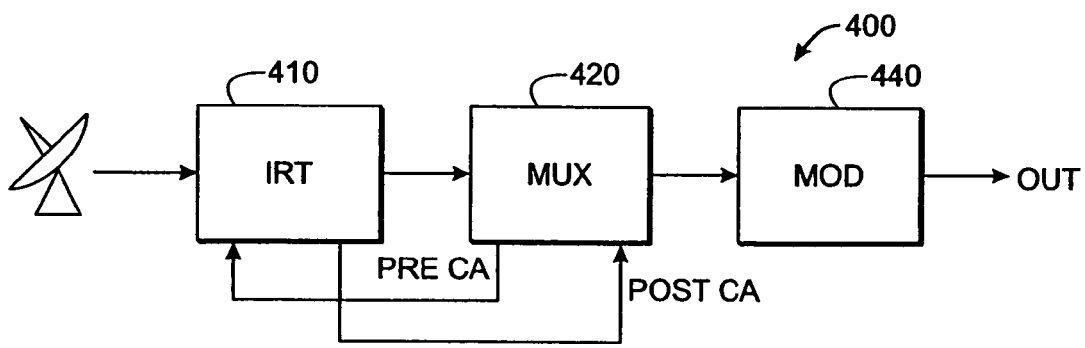
FIG. 4 is a block diagram of a time-multiplexed, multi-program encryption system employing an integrated receiver/CA system, in accordance with the invention.

FIG. 4 is a block diagram of a time-multiplexed, multi-program encryption system 400 employing a combination receiver/CA system 410. Such units are in common use today and are known as Integrated Receiver/Transcoders (IRTs). A multiplexer 420 and modulator 440 are substantially identical to their FIG. 1 counterparts (see 120, 140, respectively). In typical applications, these units are used to demodulate and decrypt programs that are received from satellite, and then re-encrypt and re-modulate the same programs so that they may be redistributed over a cable system. Common IRTs include access to intermediate output signals, thereby providing access to decrypted satellite packets. In this case, this output is connected to the input of the multiplexer. Such IRTs also include an intermediate input which can be used to accept packets to be encrypted prior to modulation. The PreCA output of the multiplexer is coupled to this input. Once encrypted, a second intermediate output of the IRT provides these same packets back to the multiplexer's Post-CA input. In the example of FIG. 4, the IRTs built-in cable modulator remains unused.

Figure 5:
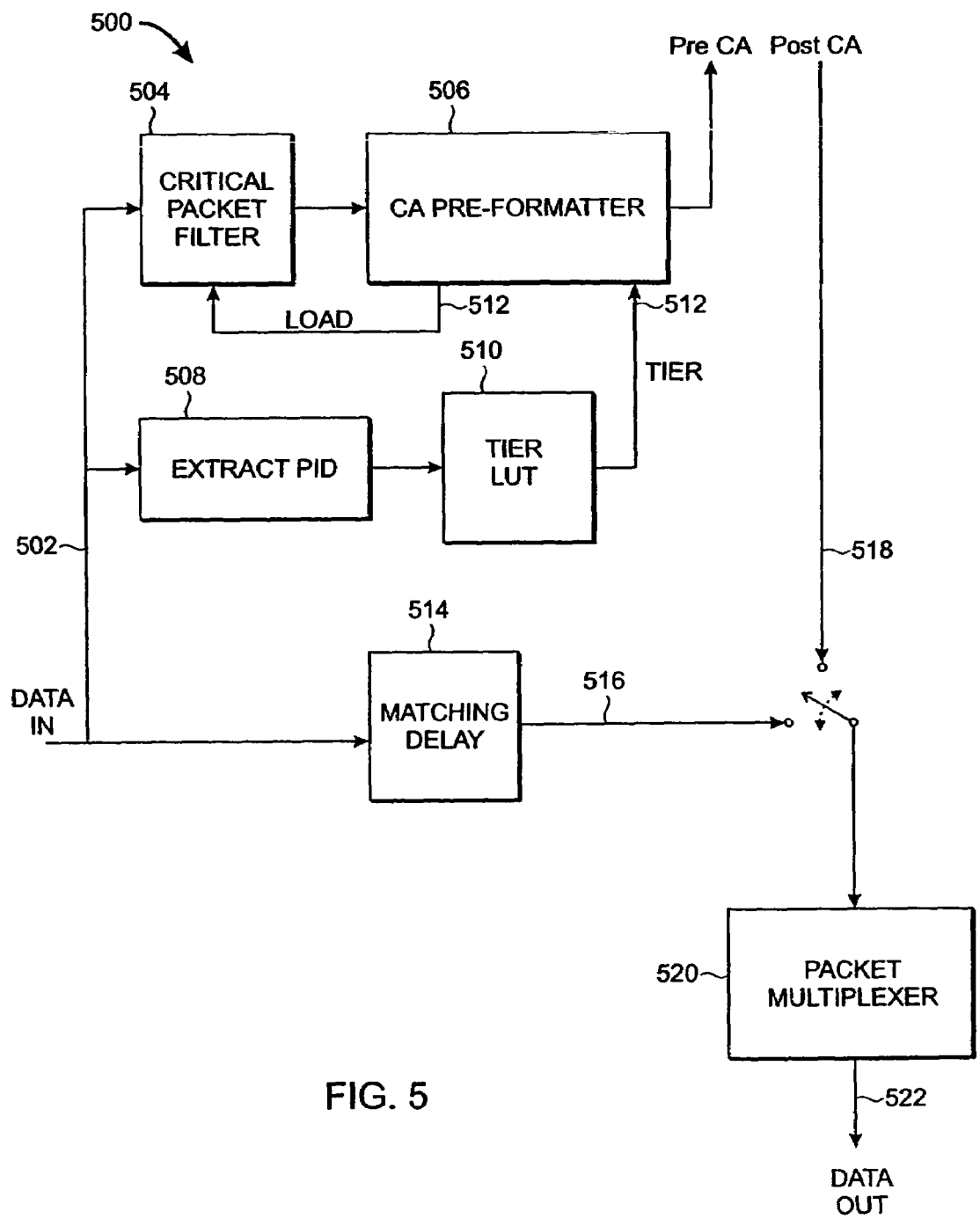
FIG. 5 is a block diagram of a multiplexer for time-multiplexed, multi-program encryption, in accordance with the invention.

FIG. 5 is a block diagram of a simple multiplexer 500 for time-multiplexed, multi-program encryption. Stream audio and video packets are provided as DATA IN 502. The stream data 502 is analyzed by a critical packet filter 504 to identify which packets are to be encrypted. Each audio and video packet of the incoming data stream is examined and determined to be either critical or non-critical. Critical packets are those which are most essential to the decoding and reconstruction process. For example, certain packets of an MPEG-compressed video stream are only needed to reconstruct a relatively small region of a single image. These are the least critical packets. However, there are other packets which produce decoded data which is essential for proper decoding of many other packets, including packets that are associated with other images, both preceding and following. Perhaps the most critical packets are the ones which provide important coding parameters such as the image resolution, frame rate, motion vector format and coding. A decoder will wait until all of this information is received before even attempting to decompress an MPEG video stream. Algorithms suitable for identifying critical packets are known in the art and will not be discussed futher herein. UNGER and CANDELORE provide examples of suitable critical packet filtering techniques.

A CA Preformatter 506 performs the task of assembling critical packets into a PRE-CA stream for encryption. Ideally, the critical packet filter 504 algorithm is responsive to a Load signal 512 generated by the CA Preformatter 506. In addition to other functions, the CA Preformatter manages the rate at which packets are released to the CA unit (i.e., it controls the data rate of the PRE-CA stream by controlling when and how often critical packets are inserted in the PRE-CA stream. The CA preformatter is discussed in greater detail hereinbelow with respect to FIG. 6. An EXTRACT PID function 508 pulls packet IDs (PIDs) and passes them to a tier look-up table 510 (TIER LUT) to identify the tier associated with a packet. The CA Preformatter uses tier information to construct pre-CA streams. A matching delay function 514 provides a delay to match processing delays, facilitating synchronization of DATA IN 502 with POST-CA encrypted data 518. A packet multiplexer 520 selects either unencrypted packets (delayed) from the matching delay function 514 or POST-CA encrypted data 518 and formats them for output on DATA OUT 522.

Figure 6:
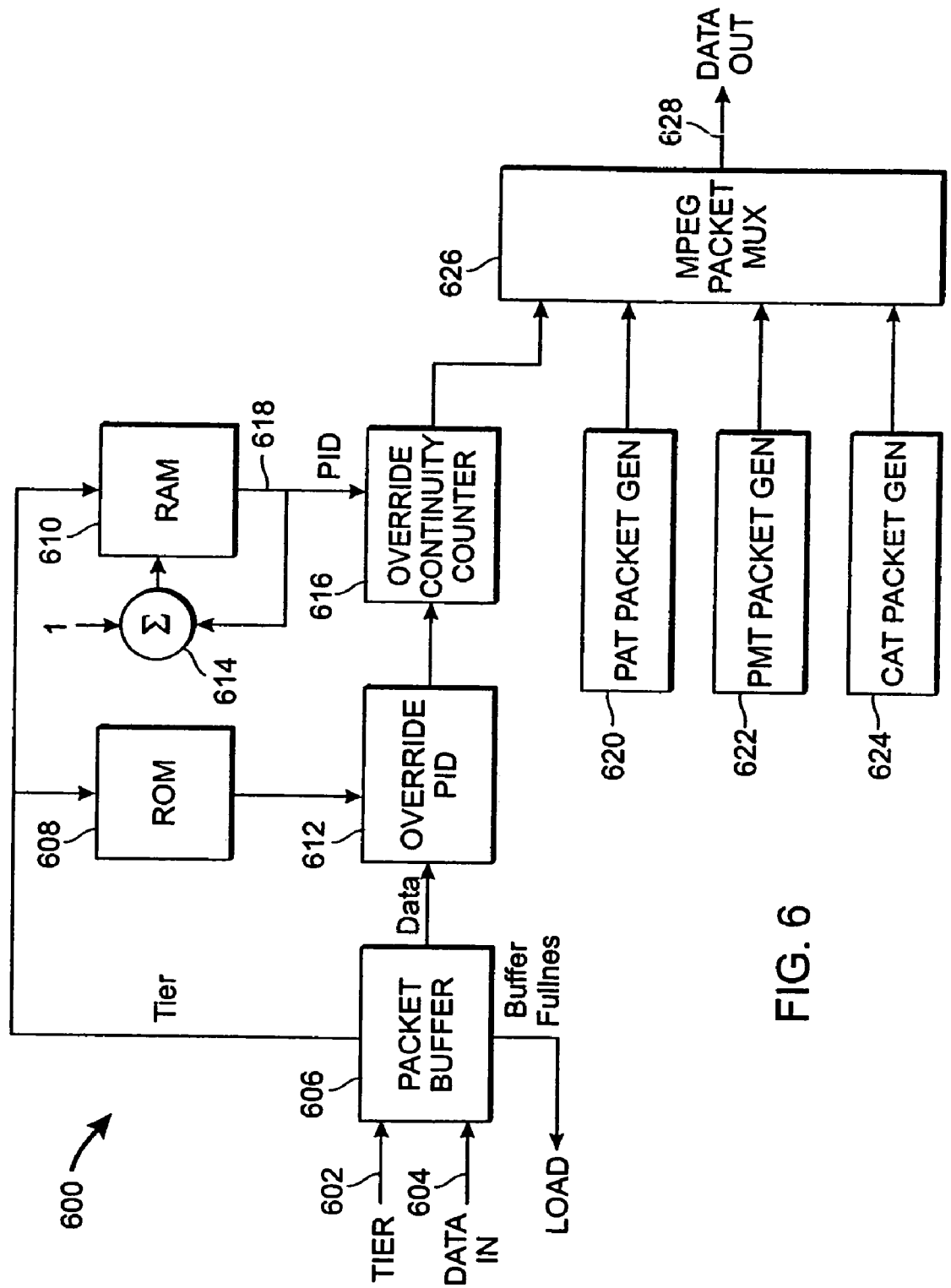
FIG. 6 is a block diagram of a CA preformatter function, in accordance with the invention.

FIG. 6 is a block diagram of a CA preformatter 600 (see, e.g., 506, FIG. 5) according to the invention. The CA preformatter 600 receives packets on a DATA IN line 604 into a packet buffer 606. The packet buffer also receives and stores tier information 602 associated with each packet. Buffer Fullness status (i.e., an indication of whether space is available in the packet buffer) is used to generate a LOAD signal to control receipt of critical packets from a critical packet filter (e.g., 504, FIG. 5). If the critical packet filter is identifying critical packets at a faster rate than the CA preformatter 600 can process and forward them to the CA system, then the critical packet filter can use this as an indication that it should alter its critical packet identification criteria to raise its criticality "threshold" for identifying packets, thereby reducing the critical packet rate. Conversely, if the LOAD signal indicates to the critical packet filter that there is plenty of buffer space available over long periods of time, the critical packet filter can use this information to lower its criticality threshold, thereby identifying more packets. This provides a mechanism for controlling the long-term average rate at which critical packets are identified and presented for encryption to match the CA system's throughput. Equilibrium is achieved when the averaged input rate to the Packet Buffer is matched with the averaged output rate. However, if the response of the Critical Packet Filter is not adequate and does not prevent the Packet Buffer from overflowing, then critical packets are dropped in their entirety (i.e., they are not encrypted). In this way, the critical packet rate will be automatically limited without corrupting the output packet stream.

The tier associated with each packet determines the service ID under which the packet will be presented to the CA unit. It is also needed if the CA unit limits the input rate of each incoming service. For instance, a particular CA design may support a maximum per-service rate equivalent to the limit imposed by a particular MPEG profile, and this limit could be less than the combined aggregate rate. In this case, the CA Preformatter 600 can generate unique LOAD signals for each tier. Each time a packet of a particular tier is considered, the CA preformatter would generate a LOAD value reflecting load limits (aggregate or per-tier) that are closer to being reached for the current tier. The tier can be determined from the 13 bit MPEG Packet Identifier code (PID) in the header of each packet. In FIG. 5, a simple lookup table is used to map this PID to TIER information provided to the CA Preformatter 600.

In order for the CA to process packets as a single service, they must be encoded with a suitable PID. In the case of MPEG transport streams, the relationship between the service and the PID is specified in the Program Association Table (PAT) and the Program Map Table (PMT). The CA unit first accesses the PAT to identify the services contained within the multiplex, and then accesses the corresponding PMTs to determine the PIDs of the packets associated with each of the services.

The CA Preformatter permits a static PID allocation scheme. According to this scheme, A PAT Packet Generator 620 generates a static PAT specifying a PID for each PMT associated with each service that is included in the same multiplex. Similarly, for each service, a PMT Packet Generator 622 generates a static PMT specifying one or more PIDs for the streams that are to be encrypted under this service. In this example there is only one stream, and therefore only one PID, per service. As each packet is extracted from the Packet Buffer, a ROM 608 is used to identify the appropriate PID corresponding to the service that is specified by the tier. Using the PID information stored in the ROM 608, an OVERRIDE PID function 612 replaces the existing 13 bit PID embedded in the packet header with the ROM PID value.

In addition to a PID, each MPEG packet header contains a 4 bit continuity count. The MPEG standard specifies that the continuity count be incremented by one with each unique packet of a single stream. However, a side effect of selecting critical packets from multiple sources and then interleaving them to form a single stream, is that the continuity count is destroyed. If ignored, the resultant MPEG encoding violations could be interpreted by the CA unit as channel errors, resulting in discarded packets. To prevent this, the CA preformatter 600 generates its own continuity count. For each tier, a count is stored in a small RAM 610, and is incremented each time it is accessed (i.e., on a per-packet basis per tier) by means of an "add 1" circuit 614. An "OVERRIDE CONTINUITY COUNTER" function 616, replaces the original continuity count in each packet with the tier-appropriate continutity count stored in the RAM. The RAM can be viewed as a set of registers that store the current continuity count on a tier-by-tier basis, one "register" per tier.

A peculiarity of certain CA units is that they require the presence of a Conditional Access Table (CAT) in each multiplex where packets are to be encrypted. Therefore, a CAT Packet Generator 624 generates a static CAT Packet. The PAT, PMT and CAT packets are inserted into the CA preformatter's DATA OUT stream 628 at regular intervals by an MPEG Packet multiplexer 626.

The packets from the CA Preformatter are sent to the CA unit where they are encrypted and then returned to the multiplexer a short time later. The multiplexer must then restore the correct PID and continuity count settings in the packet headers and reintroduce the encrypted packets into the multiplex. If the latency from the input of the CA unit to the output of the CA unit is fixed, and if this latency is known, than it becomes a simple matter to implement a matching delay (ref. 514, FIG. 5) in the multiplexer 500 as shown in FIG. 5. Since the matching delay lines up unencrypted and encrypted packets, the original PID and continuity counts are readily available in the delayed stream and can readily be substituted back into the encrypted packets. However, the transport_scrambling_control bits, which are also included in the packet header, must be taken from the encrypted stream (for encrypted packets). The entire packet payload, which is now encrypted, is also selected from the output of the CA unit. The resulting switched signal is then provided to the Packet Multiplexer 520 which implements conventional multiplexing processes.

Although simple and easy to implement, a more robust method for aligning and reintroducing the encrypted packets may be needed. The method of using a synchronized delay line may not be suitable if the CA unit latency is variable or can drift with time. Although the CA unit must maintain the ordering of packets within a particular stream, it is free to alter the original packet sequence when switching from a packet of one stream to a packet of a different stream. The CA unit also introduces Entitlement Control Messages (ECMs) and Entitlement Management Messages (EMMs) into the stream and these management and control packets must also be included in the output multiplex. Therefore, to avoid imposing restrictions on the way that packets are sequenced in the CA unit, and to allow the CA unit to insert additional packets, an alternative embodiment of the invention will be described. It is based upon a system architecture which efficiently supports the tasks of the packet multiplexer as well as the sequencing and formatting tasks needed to practice the invention.

Networked Embodiment

Figure 7:
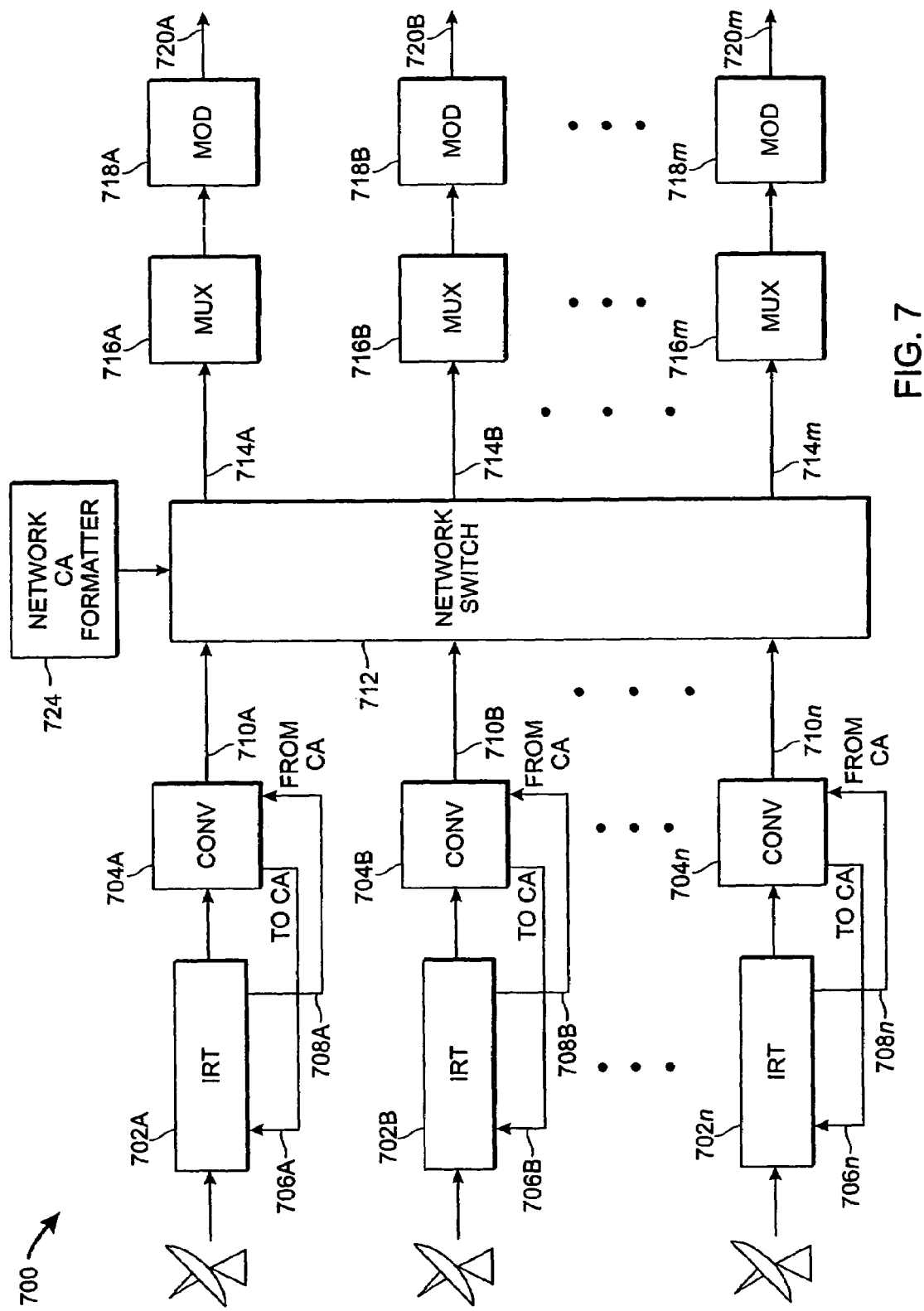
FIG. 7 is a block diagram of a networked system for time-multiplexed, multi-program encryption, in accordance with the invention.

In the preferred embodiment of the invention, devices (CA units, receivers, multiplexers, etc.) are interconnected using a network interface such as Ethernet (including 10/100 Ethernet, Gigabit Ethernet, etc.). Other network interfaces could also be employed. FIG. 7 is a block diagram of a networked time-multiplexed, multi-program encryption system 700 using conventional IRTs (Integrated Receiver/Transcoders) 702A, 702B . . . 702n. Since a typical IRT (702x) does not provide an Ethernet connection for any of its data interfaces, a like number of corresponding outboard data converters (CONV) 704A, 704B, . . . 704n are employed to translate from the IRTs' native data interfaces to the Ethernet interface. Each converter 704A, 704B, . . . 704n has a corresponding network interface 710A, 710B, . . . 710n by which it connects to a conventional network switch 712. Network Multiplexer functions 716A, 716B, . . . 716m perform functions similar to those described hereinabove for the direct-connected multiplexer 500 of FIG. 5, but adapted to communicate with one or more CAs via a network connection rather than by direct connection. The Network Multiplexers 716'x' route packets to the CAs via a Network CA formatter 724, described in greater detail hereinbelow with respect to FIG. 11. As in the embodiments shown and described hereinabove with respect to FIGS. 1, 3 and 4, the network multiplexers 716A, 716B, . . . 716m are each followed by a respective modulator 718A, 718B, . . . 718m to condition the multiplexer's output for transmission over, e.g., a cable channel.

The converter function (704x) is discussed in greater detail hereinbelow with respect to FIG. 8. The network multiplexer function is discussed in greater detail hereinbelow with respect to FIG. 14.

As described hereinabove with respect to FIG. 4, an IRT behaves as a conventional receiver with an embedded CA unit. Such IRTs usually provide "patch" points that permit the CA function to be effectively separated from the receiver function. The converters (CONV) simply provide network interfaces for each of these patch points, thereby permitting network addressable access thereto.

Figure 8:
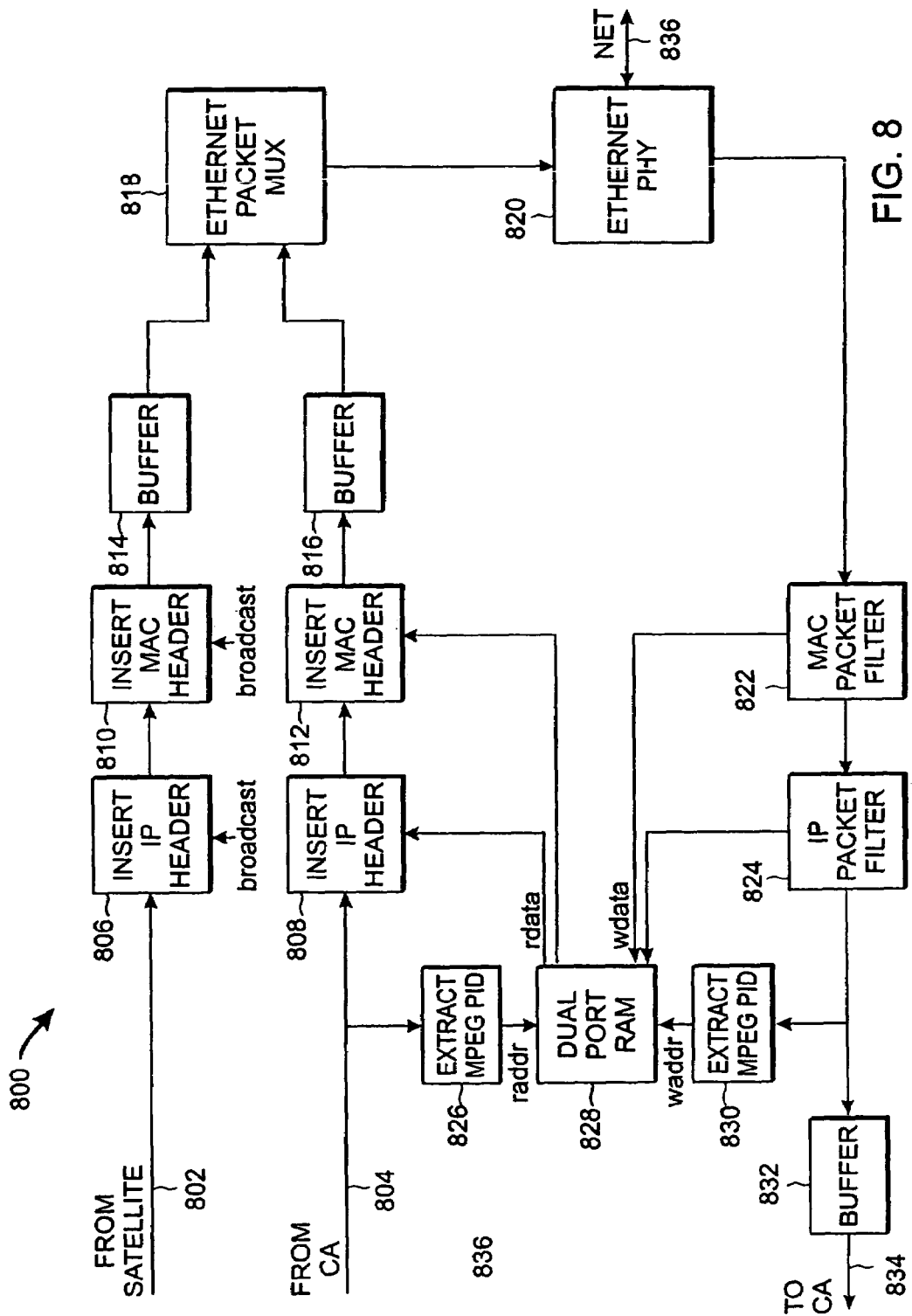
FIG. 8 is a block diagram of a network converter for interfacing IRTs (integrated receiver/transcoders) to a network, in accordance with the invention.

FIG. 8 is a block diagram of a network converter 800 (ref. 704x, FIG. 7) for interfacing IRTs to a network such as an Ethernet network. "Direct" unencrypted, demultiplexed packets received by the IRT from, e.g., a satellite (FROM SATELLITE) arrive on converter input line 802. MPEG packets received on the converter input line 802 are then encapsulated into Ethernet frames by inserting an Ethernet (MAC) header, an Internet Protocol (IP) header, and optionally a layer 4 header such as UDP or TCP. In the Figure, this is accomplished by an Insert IP Header function 806 and Insert MAC Header Function 810. Any other optional header insertion can be accomplished in similar fashion. The IP and MAC headers specify the destination addresses used by network switching devices to route each Ethernet packet to the proper address, and the source addresses to be used by the destination host when generating a response. As many as 7 MPEG packets can be grouped into a standard (non-jumbo) ethernet frame.

If it is desirable to broadcast or multicast the MPEG packets received from satellite to one or more subnets of the entire network, this can be implemented on the Network Converter 800 by setting the ethernet or IP headers accordingly to indicate a "broadcast" mode of transmission. The fully encapsulated ethernet frames are then buffered so that they can be multiplexed with other outgoing traffic via an Ethernet Packet Multiplexer 818, and then prepared for transmission onto the net 836 by an Ethernet PHY module 820. The Ethernet PHY module implements 820 the low level signaling and formatting for physical Ethernet interconnect hardware.

Packets that are to be encrypted by the IRT must also pass through the Converter 800. Such packets are received from the network by the Ethernet PHY 820 and are checked by the MAC Packet Filter and the IP Packet Filter. If the ethernet or IP destination addresses do not match the address of the IRT/Converter 800, then the packets are ignored. If they do match, the MAC Header, IP Header, and any additional headers such as UDP or TCP, are removed and provided to the write data port of a dual port RAM 828. The dual port RAM 828 maintains a table of header data for each MPEG PID of the encapsulated MPEG packets by using the MPEG PID to specify the RAM address (waddr). This is accomplished by an EXTRACT MPEG PID function 830, which converts the MPEG PID to an appropriate RAM address to which the IP header, MAC header (and optionally, other header) data is to be stored in the dual port RAM 828. The MPEG PID is extracted from the first MPEG packet in the Ethernet frame and used to specify the address in the dual port RAM 828. If there is more than one MPEG packet in the frame, then they are all assumed to have the same PID. Once the ethernet headers have been stripped, the remaining MPEG data is stored in buffer 832, which releases the data at a rate that is compatible with the CA input port on the IRT (i.e., acting as an elastic buffer). The IRT encrypts these packets and then returns them via its CA output port (patch point) onto the "FROM CA" port 804 of the Converter.

The encrypted MPEG packets received at the FROM CA port 804 are prepared for distribution over the network by appending the same Ethernet frame headers that were saved when the packets were received from the network. This is done by extracting the PID from MPEG packet header (via EXTRACT MPEG PID function 826 ) and using the PID to address dual port RAM 828. The retrieved IP, and Ethernet MAC frame headers (and optionally, UDP/TCP headers) are then inserted at the start of the MPEG packet after swapping source and destination addresses. This is accomplished via INSERT IP HEADER and INSERT MAC HEADER functions 808 and 812 which use the IP and MAC address information retrieved from the dual port RAM 828 to encapsulate the MPEG packets into an Ethernet frame. If the next MPEG packet in sequence has the same PID as one previously retrieved, then both may be included as part of the same Ethernet frame. As many as seven MPEG packets may be included in a standard ethernet frame. Packet-length fields in one or more headers may need to be adjusted, depending on the number of MPEG packets included in a particular ethernet frame. Finally once the ethernet frame is complete, it is deposited in a small buffer 816 and switched into the network stream by Ethernet Packet Mux 818.

Figure 9:
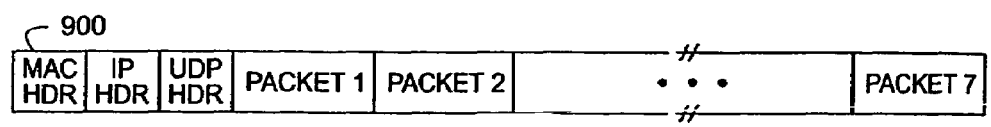
FIG. 9 is a diagram illustrating grouping of MPEG packets into an Ethernet frame, in accordance with the invention.

FIG. 9 illustrates the encoding of seven MPEG packets into an Ethernet frame 900. The frame 900 begins with a MAC header (MAC HDR) an IP header (IP HDR) and optional UDP Header, followed by the seven MPEG packets PACKET 1, PACKET 2,. . . . PACKET 7.

Figure 10:
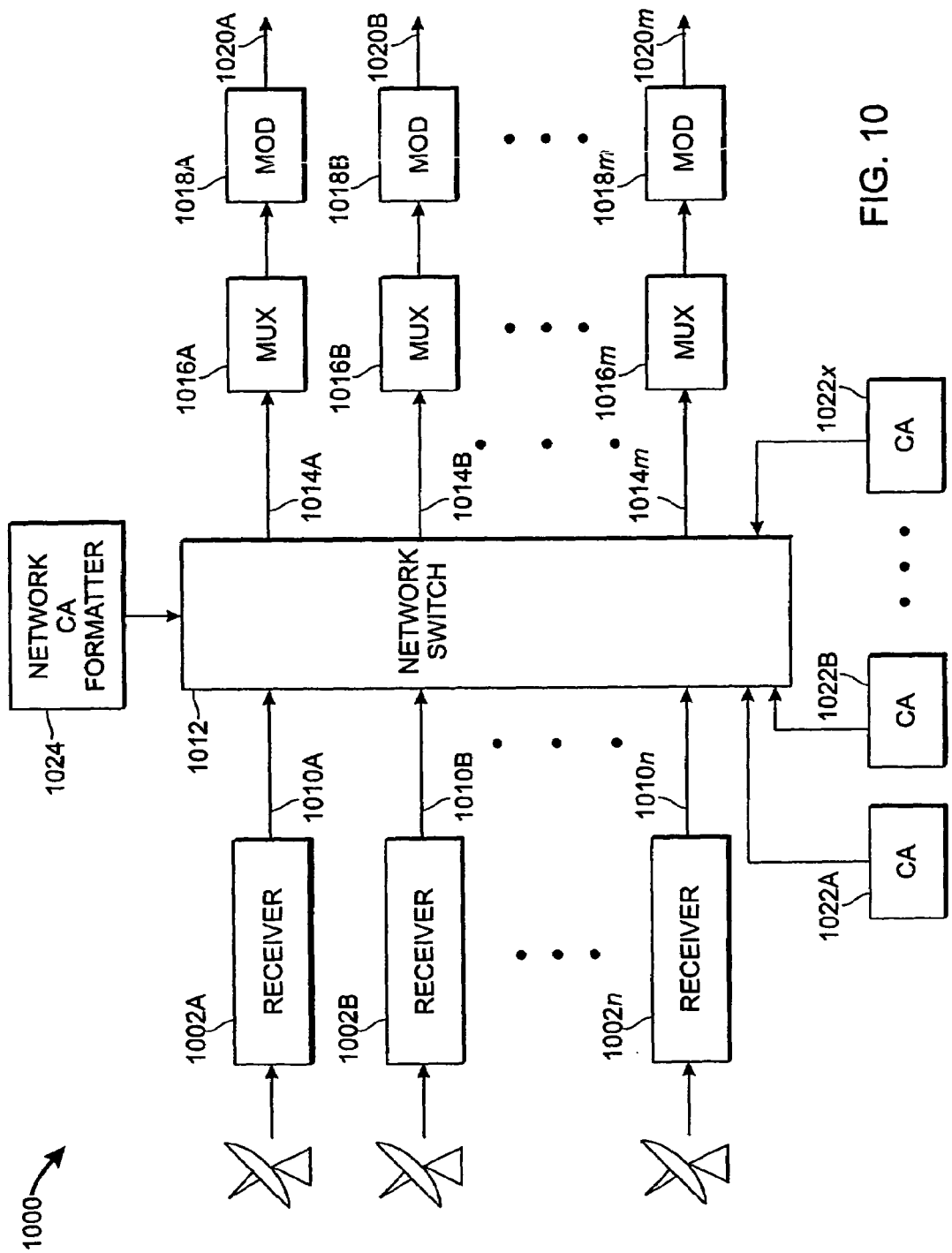
FIG. 10 is a block diagram of an alternate embodiment of a networked system for time-multiplexed, multi-program encryption employing networked CA units, in accordance with the invention.

FIG. 10 is a block diagram of a networked time-multiplexed, multi-program encryption system 1000, similar to the system of FIG. 7, except that in place of integrated IRTs, the system 1000 employs separate network-capable receivers 1002A, 1002 B, . . . , 1002n and network-capable CAs 1022A, 1022B, . . . 1022'x'. Because of their network capabilities, the receivers 1002'x' and CAs 1022'x' eliminate the need for Ethernet converters (e.g., 704'x', FIG. 7). The broadcasted packets may be ignored or selected by one or more Multiplexers 1016A, 1016B, . . . 1016'm'. In this example, the multiplexers also select which MPEG packets are to be encrypted, and these packets are sent to a Network CA Formatter 1024 via the same Ethernet network (Network Switch) 1012. All packets received by the Network CA Formatter 1024 are grouped according to their assigned encryption tier, and each such group is sent to a CA unit 1022'x' as a single continuous stream. The Network CA Formatter 1024 also modifies certain header fields and inserts additional information, both to achieve compatibility with the CA units 1022'x' and to acquire and maintain synchronization once the packets are encrypted and returned from a CA unit 1022'x' back to the Network CA Formatter 1024. The streams are then ungrouped, proper MPEG headers are restored, and each encrypted packet is returned to the multiplexer 1016'x' from which it originated. The multiplexer 1016 reintroduces the packets into their corresponding streams, which are then provided to a modulator prior to distribution over the cable system.

One advantage of the system 1000 of FIG. 10, which uses partitioned Receivers and CA units, is that the number of CA units 1022'x' can be scaled independently of the number of receivers 1002'x' in order to meet the requirements of a particular system. The number of CA units 1022'x' should depend upon the size of the network, the number of encryption tiers, the ratio of encrypted packets to unencrypted packets, and the integration density of each CA unit implementation. For simplicity during the following discussion, it will be assumed that a single CA unit is able to meet the requirements of the entire network. Note that in some cases, it may also be necessary to add additional Network CA Formatter Units. As with the number of CA units, this depends upon the size of the network, the ratio of encrypted packets to unencrypted packets, and the integration density.

Figure 11:
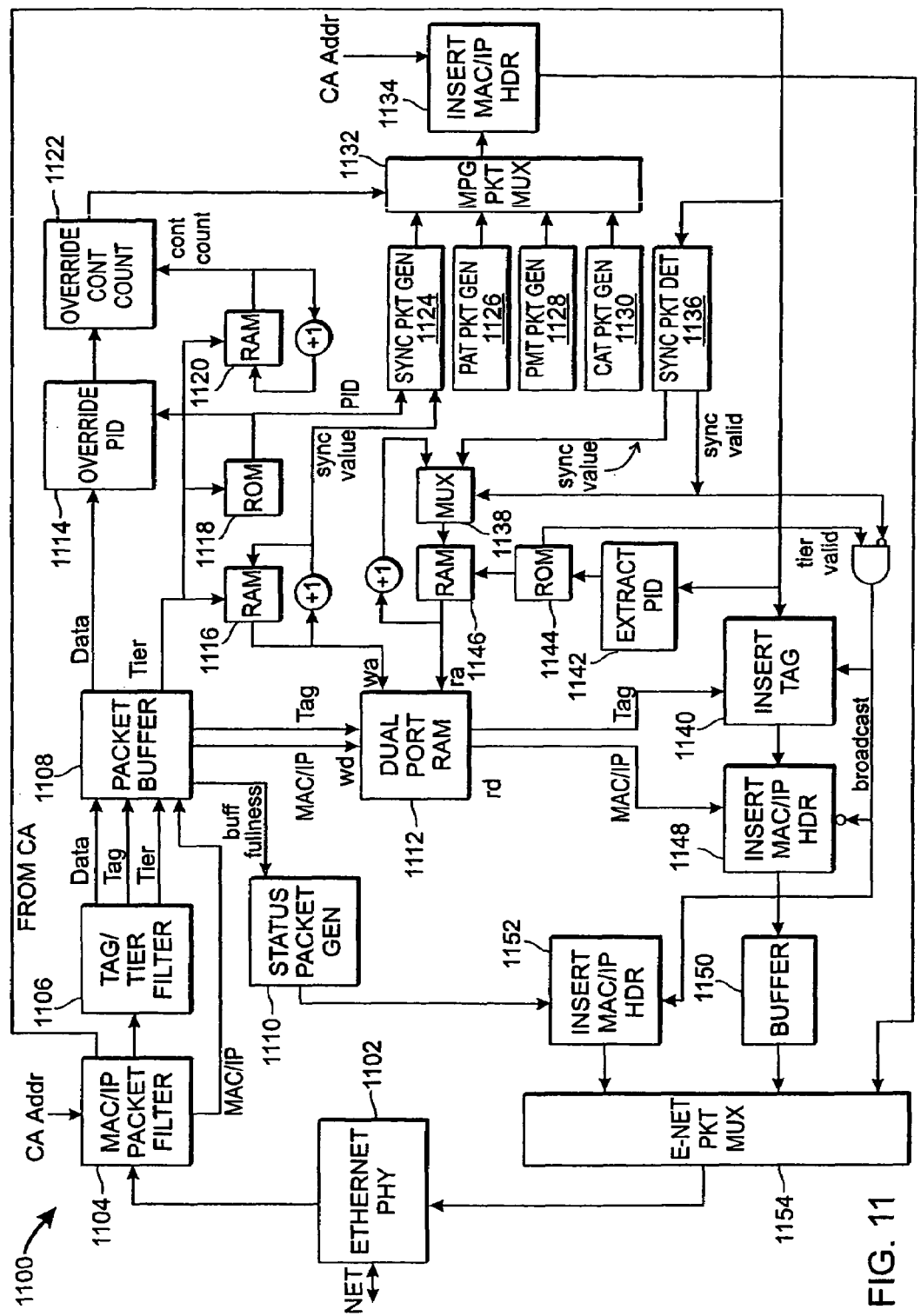
FIG. 11 is a block diagram of a network CA preformatter, in accordance with the invention.

FIG. 11 is a block diagram of a Network CA Formatter 1100 (see 724, FIG. 7; 1024, FIG. 10). Packets are received over an Ethernet PHY 1102 connected to an Ethernet network (NET). These packets are processed by a MAC/IP Packet Filter 1104. The MAC/IP Packet Filter distinguishes between unencrypted "critical" packets received from a Network Multiplexer (e.g., 1016'x', FIG. 10) and encrypted packets returned by a CA unit (e.g., 1022'x', FIG. 10). The MAC/IP Packet filter separates the Ethernet MAC/IP header information from the packet and examines MAC, IP, and any other network headers identifying the source of the packet. The remainder of the packet data is then supplied to an "Insert Tag" module 1140, Sync Packet Detector 1136 and Extract PID function 1142 if the packet was received from a CA unit, or directly to a Tag/Tier Filter 1106 if the packet was received from a Network Multiplexer.

Figure 12:
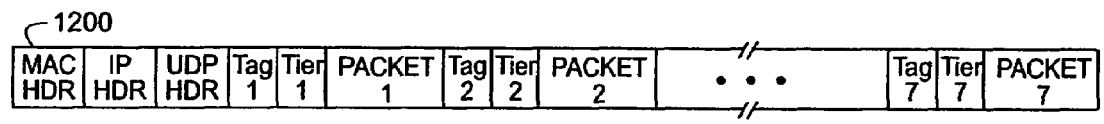
FIG. 12 is a diagram illustrating the association of tag/tier information with MPEG packets in an Ethernet frame, in accordance with the invention.

Packets received by Tag/Tier Filter 1106 are examined for information inserted by the Network Multiplexers. For each MPEG packet to be encrypted, the Multiplexer inserts a Tag that is needed by the Multiplexer to uniquely identify each packet, and a Tier parameter that is used by the Network CA Formatter 1100 to identify which CA "service" group the packet is associated with. This "service" group identification is used when grouping packets into streams that are statically assigned to each service of the CA units. (FIG. 12 shows one suitable placement of these parameters within an Ethernet frame). The Tag/Tier Filter 1106 separates this information (Tag/Tier) and provides it to a Packet Buffer 1108 along with the remaining packet data and the MAC/IP header information (from MAC/IP Packet Filter 1104 ). The Packet Buffer behaves as an elastic buffer (FIFO) to match the rate of incoming packets to the rate at which they can be accepted by the CA unit. Each time a packet is removed from the Packet Buffer 1108, the MAC/IP header and the Tag parameter are stored in a Dual Port Ram 1112. This information is needed once again after the packet is encrypted by the CA unit and returned to the Network CA Formatter 1100. The address in the Dual Port Ram is determined by the output of a RAM 1116, which is addressed using the Tier Parameter for the packet as retrieved from Packet Buffer 1108. A block of Dual Port RAM addresses is reserved for each Tier, and the current address within the current tier's block of addresses is incremented (circularly—i.e., with wraparound) by one each time a new packet is stored in the Dual Port RAM. 1112.

The MPEG packet data is also supplied by Packet Buffer 1108 to Override PID module 1114, which forces the MPEG PID to a value that is determined by the Tier parameter. The mapping from the MPEG PID to the override PID value is static and specified by a ROM 1118. By assigning the same PID to all packets from the same tier, they are made to appear as a single stream to the CA unit. However, the continuity count parameter in the MPEG headers is relied upon to detect duplicate packets and continuity errors resulting from dropped/lost packets. This parameter is expected to increment by one with each successive packet of a particular stream. As described hereinabove for the CA Preformatter 600 of FIG. 6, this continuity count is overridden in packets sent to the CA. A running continuity counter is maintained for each tier by means of a small RAM 1120 in an auto-incrementing circuit. There is one entry in the RAM 1120 for each tier, each entry containing the current continuity count for that tier, from the point of view of the CA units. Each time a location in the RAM 1120 is accessed, it is incremented by one (circularly—with wraparound to 0). This sequentially-increasing tier-specific continuity count is written into the packet by an Override Continuity Count function 1122, replacing the original value with the value stored in the RAM 1120.

The "overridden" MPEG packets produced by the Override Continuity Count function 1122 are provided to MPEG Packet MUX 1132, which periodically inserts packets from Sync Packet Generator 1124, PAT Packet Generator 1126, PMT Packet Generator 1128, and CAT Packet Generator 1130 into the stream of packets bound for the CA Unit(s). The PAT (Program Association Table), PMT (Program Map Table), and CAT (Conditional Access Table) packets are static and need only be inserted relatively infrequently, as determined by CA unit requirements or other standard. The PAT and PMT tables are used to identify MPEG PID(s) of stream(s) associated with each CA "service". The MPEG standard specifies the format of these tables. The general format of the CAT is also specified by MPEG, but certain descriptor fields are CA-specific. Certain CA units generate their own CATs, and in such cases, the CAT Packet Generator can be eliminated. In other cases, the CA unit will look for an existing CAT and update descriptor fields within the CAT as required.

The Sync Packet Generator 1124 is used to allow the stream of encrypted packets returned by the CA unit to be synchronized with the MAC/IP headers and the Tag information stored in Dual Port Ram 1112. Sync Packets should be generated for each MPEG PID that is in use and inserted into the associated CA outgoing data stream at regular intervals. For each Tier, the Sync Packet specifies the current address for writing MAC/IP and Tag header information into Dual Port Ram 1112. Although many Sync Packet formats are possible, a suitable Sync Packet format is listed below. The MPEG PID that is assigned to the Sync Packet is the same PID that is associated with the Tier and is specified by ROM 1118. The packet is organized as an MPEG Adaptation Header containing private data and no payload.

SYNC PACKET

| Name | Size (bits) | Data Pattern |
|---|---|---|
| sync_byte | 8 | 01000111 |
| transport_error_indicator | 1 | 0 |
| payload_unit_start_indicator | 1 | 0 |
| transport_priority | 1 | 0 |
| PID | 13 | (preassigned for each service) |
| transport_scrambling_control | 2 | 00 |
| adaptation_field_control | 2 | 10 |
| continuity_counter | 4 | 0000 |
| adaptation_field_length | 8 | 10110111 (183 decimal) |
| adaptation_flags | 8 | 00000010 |
| transport_private_data_length | 8 | 00000010 |
| private_data_byte | 16 | sync value |
| stuffing byte | 8 × 179 | 11111111 (repeats 179 times) |

The output of MPEG Packet MUX 1132 is provided to Insert MAC/IP Header module 1134, which inserts Ethernet framing with the destination address set to match the address of the CA unit. If there is more than one CA unit, then the address will depend on the assigned Tier. The fully formed Ethernet frames are then provided to Ethernet Packet Mux 1154 which transmits the frames out over the network (NET) via the Ethernet PHY module 1102.

Once the packets are encrypted by the CA and returned to the Network CA Formatter 1100, they are detected by MAC/IP Packet Filter 1104 and supplied to Insert Tag module 1140, Extract PID module 1142, and Sync Packet Detector 1136. Sync Packets are detected by the Sync Packet Detector when a packet consists only of an adaptation header and the adaptation header consists of a single private data word (as specified in the table above). The Sync-Value output is then set to the value of this private data word and the Sync-Valid output is simultaneously asserted. This causes Sync-Value to be selected by MUX 1138 and provided as input to RAM 1146. The RAM address is the Tier parameter provided by ROM 1144 based on the MPEG PID extracted from the incoming packet by Extract PID module 1142. This causes RAM 1146 to store the correct Dual Port RAM address corresponding to the next MPEG packet in the same Tier group. Alternatively, if the current packet is not a sync packet, then the address of the next packet is derived by incrementing the current address for the Tier group by one.

Figure 13:
FIG. 13 is a diagram illustrating a tagged MPEG packet in an Ethernet frame, in accordance with the invention.

Based on the MPEG PID, ROM 1144 also generates a Tier-Valid signal. This signal is asserted for all packets except for the PAT, PMT and CAT packets generated by PAT Packet Generator module 1126, PMT Packet Generator module 1128, and CAT Packet Generator Module 1130, (as well as ECM, EMM, and any other packets that may have been introduced by the CA unit). That is, only the single PID value associated to each valid encryption Tier will cause Tier-Valid to be asserted. If Tier-Valid is asserted, then the Tag parameter is inserted by module 1140, and the MAC/IP header is inserted by module 1148 after swapping the destination and source addresses in the headers received from Dual Port Ram 1112. The resultant ethernet frame 1300 is shown in FIG. 13 and consists of a MAC Header (MAC HDR), IP Header (IP HDR), UDP Header (UDP HDR), Tag, and the Packet itself.

Returning once again to FIG. 11, it should be noted that if a subsequent packet shares the same MAC/IP header as its predecessor, then the same Tag value can be appended along with the subsequent packet to the same Ethernet frame as the predecessor packet, limited only by a maximum of seven MPEG packets per standard Ethernet frame.

Packets that do not match a valid tier (i.e., when Tier-Valid is not asserted) are still transmitted to the network. However, in this case, the Insert Tag 1140 module is disabled, causing it to relay the MPEG packets without inserting a tag into the frame. In addition, the Insert MAC/IP Header module 1148 is set to broadcast or multicast mode, causing it to ignore any input from the Dual Port RAM 1112 and to insert a broadcast or multicast header instead. This is significant, since certain packets, such as ECMs and EMMs that are generated by the CA unit, now apply to multiple streams and will be needed by all Network Multiplexers that access these streams. The Multiplexers can identify these packets by examining the PAT and PMT tables that were generated by the Network CA Formatter 1100 and, in some cases, modified by the CA unit. These packets are also transmitted to the network in broadcast mode. Buffer 1150 is used to temporarily store the Ethernet frame received from Insert MAC/IP Header module 1148 when the Ethernet Packet Mux is busy transmitting packets received from Insert MAC/IP Header module 1152 or Insert MAC/IP Header module 1134. Some buffering capacity is already inherent in these other paths, and additional buffers are not shown in FIG. 11.

In order to ensure that the Multiplexers do not exceed the capacity of the CA unit, some feedback must be provided back to the network. This is the purpose of Status Packet Generator module 1110. The current buffer fullness level of Packet Buffer 1108 is taken as an input parameter to the Status Packet Generator 1110 and is encapsulated into an MPEG packet. As with Sync Packet Generator 1136, this is done by generating an Adaptation Header that fills the entire packet, thereby leaving no room for payload. Within the Adaptation Header, a private data field is used to convey the Buffer-Fullness parameter. A proposed format for the status packet is provided in the table below. The output of Status Packet Generator 1110 is provided to Insert MAC/IP Header module 1152, which inserts a broadcast Ethernet header and sends the resulting frame to Ethernet Packet Mux 1154. The Ethernet frames resulting from the output of the Status Packet Generator 1110 must be selected by the Ethernet Packet Mux 1154 at regular intervals. The Status Packets are received by the Network Multiplexers, which select the critical packets to be encrypted. When the Status Packets indicate that the Packet Buffer fullness is decreasing, the multiplexers may lower the critical packet threshold in order to increase the number of packets that are sent to the Network CA Formatter. Similarly, when the Status Packets indicate that the Packet Buffer fullness is increasing, the multiplexers should increase the critical packet threshold, thereby reducing the number of packets that are sent to the Network CA Formatter. However, if the response of one or more multiplexers is not adequate and overflow of Packet Buffer 1108 is not avoided, then control logic should be provided to ensure that such packets are dropped in their entirety. In this way, the critical packet rate will be automatically limited without corrupting the output signal.

STATUS PACKET

| Name | Size (bits) | Data Pattern |
|---|---|---|
| sync_byte | 8 | 01000111 |
| transport_error_indicator | 1 | 0 |
| payload_unit_start_indicator | 1 | 0 |
| transport_priority | 1 | 0 |
| PID | 13 | (preassigned for each service) |
| transport_scrambling_control | 2 | 00 |
| adaptation_field_control | 2 | 10 |
| continuity_counter | 4 | 0000 |
| adaptation_field_length | 8 | 10110111 (183 decimal) |
| adaptation_flags | 8 | 00000010 |
| transport_private_data_length | 8 | 00000010 |
| private_data_byte | 16 | buffer fullness |
| stuffing byte | 8 × 179 | 11111111 (repeats 179 times) |

Figure 14:
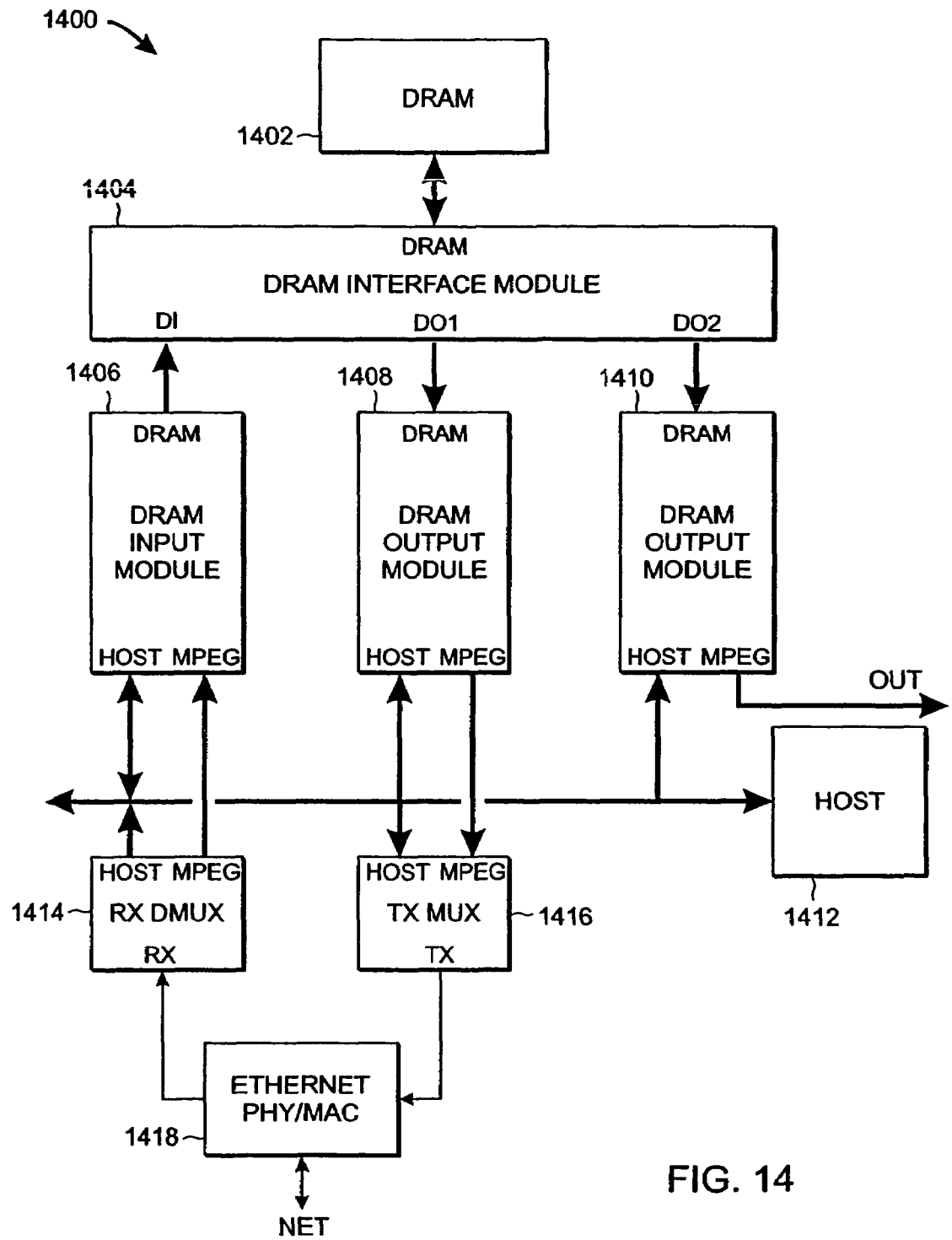
FIG. 14 is a block diagram of a network multiplexer, in accordance with the invention.

FIG. 14 is a block diagram of a Network Multiplexer 1400 (see, e.g., 1016'x', FIG. 10), comprising an Ethernet PHY interface 1418, a receive demultiplexer (RX DMUX) 1414, a transmit multiplexer (TX MUX) 1416, a host processor 1412, a DRAM input module 1406, two DRAM output modules 1408 and 1410, a DRAM interface module 1404, and DRAM 1402. All input packet traffic is received from the network by Ethernet PHY/MAC module 1418 and conveyed to RX DMUX module 1414. The RX DMUX module 1414 parses the Ethernet frame headers and determines if the frame includes MPEG traffic or general Ethernet communications bound for the Host processor 1412. MPEG traffic is sent to an MPEG input port of the DRAM Input Module 1406 after the Ethernet and IP framing have been removed by the RX DMUX module 1414. All other traffic is sent directly to the Host with Ethernet and IP framing intact. The RX DMUX module 1414 is discussed in greater detail hereinbelow with respect to FIG. 15. The DRAM Input Module 1406 is discussed in greater detail hereinbelow with respect to FIG. 16.

Figure 15:
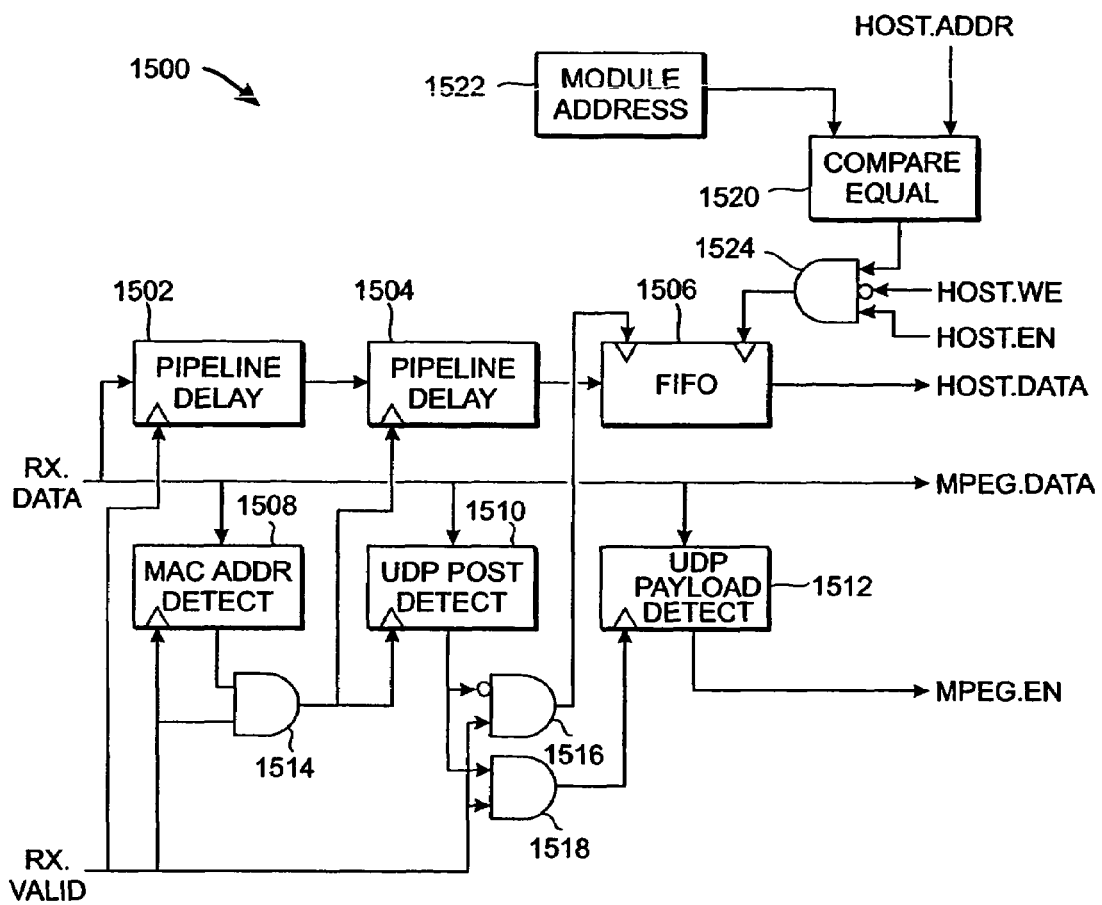
FIG. 15 is a block diagram of a Receive De-Multiplex portion of a network multiplexer, in accordance with the invention.

FIG. 15 is a block diagram of a RX DMUX module 1500 (see 1414, FIG. 14), for receiving and processing incoming network traffic within a Network Multiplexer (e.g., 1400, FIG. 14; 1016'x', FIG. 10). Network data received via an Ethernet PHY module is presented at inputs of a MAC address detector 1508, a UPD POST Detector 1510, a UDP payload detector 1512, and to a data input of a FIFO 1506 via two pipeline delays 1502 and 1504. MPEG data out of the RX DMUX module 1500 is directly connected to the RX Data input of the module, effectively presenting network data directly at the MPEG data output. The MAC address detect module 1508, qualified by a RX VALID signal, detects MAC addresses associated with host communications and with incoming MPEG traffic bound for the Network Multiplexer. A gating circuit 1514 holds off detection of UDP Post detection until after a valid MAC address is detected. Once a valid mac address has been detected, the UDP POST detector 1510 is permitted to look for and recognize a UDP header. If the MAC address is valid and the UDP POST detector finds a UDP header, the UDP Payload detector 1512 is clocked (qualified by gate 1518). An output from the UDP Payload detector signals that MPEG data is present by generating an MPEG.EN signal. At this point, the MAC Header, IP header and UDP headers have all passed, leaving only MPEG packet data remaining. If the MAC address is valid and there is no UDP header detected, receive data is clocked through the pipeline delays 1502 and 1504 into the FIFO 1506 intact (i.e., with MAC/IP Headers intact). Such data is assumed to be general Ethernet communications traffic for the host. Upon detecting that a general communications packet (i.e., a packet bound for the MAC address detected by the MAC address detector 1508, but not containing an MPEG-related packet payload), the host processor can address and read data out of the FIFO 1506 by means of addressing circuitry comprising an address comparator 1520 (for comparing a host-generated address to a pre-determined module address) and a gate 1524 for detecting host-initiated data read requests direct to the address identified by the address comparator 1520.

Returning again to FIG. 14, MPEG packets received by DRAM Input Module 1406 are forwarded to the DRAM interface module 1404 for storage in DRAM 1402. This includes both unencrypted packets received from satellite or some other source and encrypted packets received from a CA unit (e.g., 1022'*x*', F*ig*. 10 ).

Figure 16:
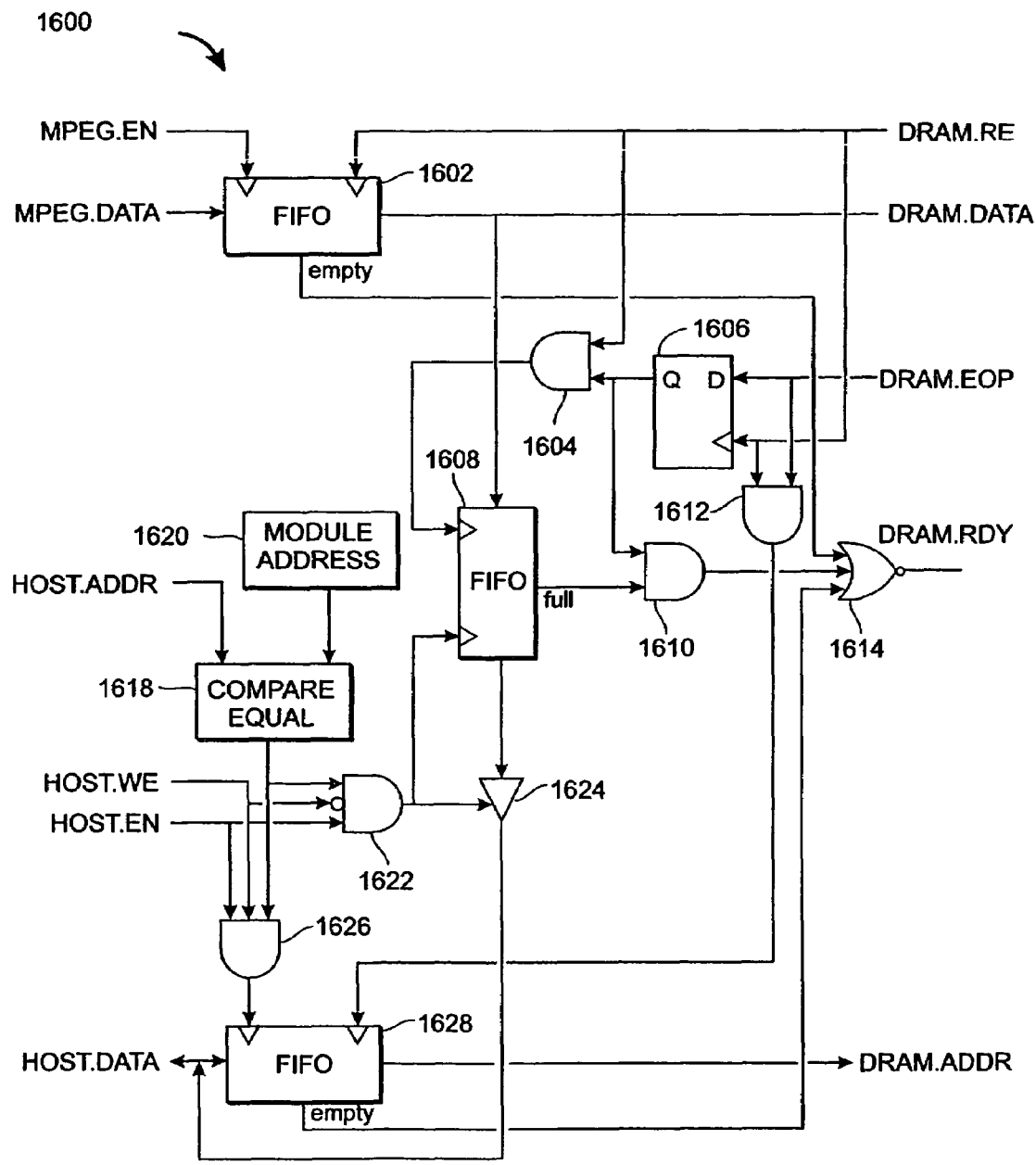
FIG. 16 is a block diagram of a DRAM Input module portion of a network multiplexer, in accordance with the invention.

FIG. 16 is a block diagram of a DRAM input module 1600 (see, e.g., 1406, FIG. 14). The host processor (1412, FIG. 14) writes starting addresses for packet transfers into a FIFO 1628 by means of circuitry comprising an address comparator 1618 for comparing a host-generated address against a predetermined module address (for the DRAM input module), and a gate 1626, which detects host data write operations directed to the predetermined module address 1620. The host data bus connects directly to a data input of the FIFO 1628. A new address value is fetched from the FIFO 1628 each time a complete packet is read (as indicated by a DRAM cycle with DRAM.RE=1 and DRAM.EOP=1). This condition is decoded by a gate 1612, the output of which is used to clock out a new address from FIFO 1628. MPEG packet data is read directly into a FIFO 1602, and is subsequently transferred to the DRAM by means of the DRAM interface module (described in greater detail hereinbelow with respect to FIG. 19). The host processor does not know the nature of the data to be received at any particular DRAM address it writes into the address FIFO 1628. Therefore, as the DRAM Input Module 1600 forwards MPEG packets from the FIFO 1602, it also copies packet header information into a FIFO 1608 for later retrieval by the Host. The Host accesses the FIFO 1608 by generating data read cycles directed to the module address 1620. A gate 1622 detects read cycles directed to this address and clocks data out of the FIFO 1608 and turns on a tri-state buffer 1624 to place the retrieved header data onto the host's data bus (HOST.DATA). The capture of MPEG packet header data into the FIFO 1608 is controlled by a D-Flop 1606 (acting as a one-cycle delay) and a gate 1604. In combination, these elements cause first data transfer after an end-of-packet (DRAM.EOP) indication to be clocked into the FIFO 1608 (i.e., the first data transfer of each packet. This arrangement assumes that the width of the DRAM data path is sufficient to capture all of the header information (which occurs at the beginning of the packet) in a single transfer.

Generally, DRAM cycles to read data out of the FIFO 1602 are generated as long as the DRAM ready signal (DRAM-.RDY) is true. This condition is decoded by gates 1614 and 1610, and indicates a condition where there is data available in the FIFO 1602, there is a valid packet start address present at the output of the address FIFO 1628 (i.e., FIFO 1628 is not empty) and the header information FIFO 1608 is not full at the start of a packet.

A First DRAM Output Module 1408 is used to transfer MPEG packets from DRAM 1402 to the network (NET) via the TX MUX module 1416. These packets are "critical" packets identified and selected by a suitable algorithm running on the Host processor 1412, and are ultimately encrypted by a CA unit and returned. A second DRAM Output Module 1410 is used for final transfers of packets out of the multiplexer to a modulator, typically. Other than the different connections of their MPEG data ports (the first DRAM output module 1408 having its MPEG data port connected to the TX MUX 1416 and the second DRAM output module 1410 having its MPEG data port connected as the multiplexer's output port and connected to a modulator) the two DRAM Output Modules 1408, 1410 are identical.

Figure 17:
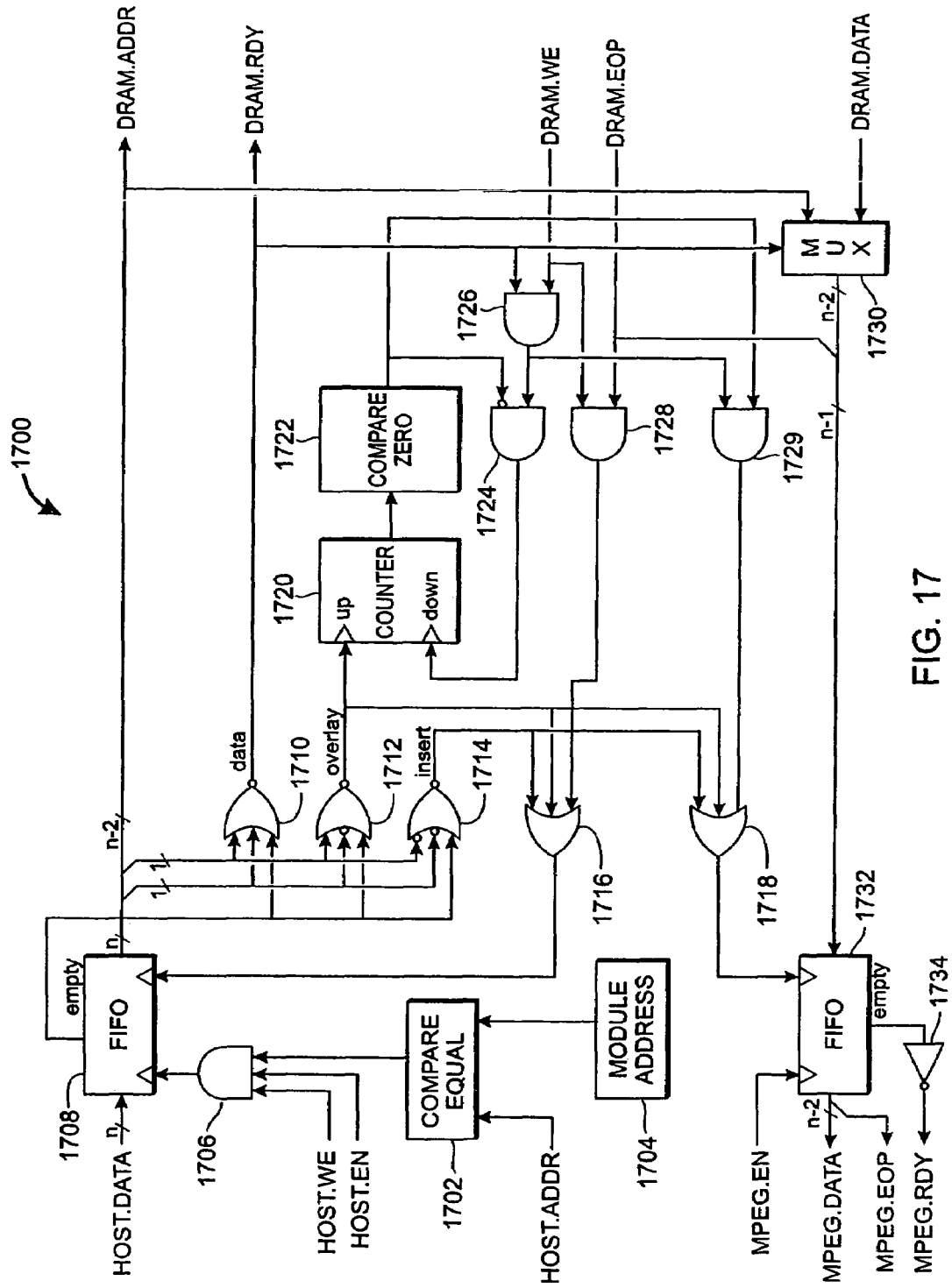
FIG. 17 is a block diagram of a DRAM Output module portion of a network multiplexer, in accordance with the invention.

FIG. 17 is a block diagram of a DRAM Output module 1700 (see, e.g., 1408, 1410, FIG. 14). When a packet is selected for output (e.g., a "critical" packet to be sent out for encryption by a CA unit), the host writes the DRAM address at which the packet is stored into an address FIFO 1708. The mechanism for accomplishing this transfer is identical to that used to write packet addresses to the DRAM Input module described hereinabove, and comprises a comparator 1702 for comparing a host address (HOST.ADDR) against a predetermined DRAM Output Module address 1704, and a gate 1706 for detecting Host write cycles directed to that module address. The output of the gate 1706 strobes the host data into the FIFO 1708. The output of the address FIFO 1708 provides a starting address for packet transfers from the DRAM. Address data written to the FIFO includes two extra bits (the two most significant bits of the address values stored in the FIFO by the host) that control data transfer modes that permit the host to overwrite DRAM data or to insert data values into the DRAM data stream. This is particularly useful in allowing the host processor to override specific packet data values (source/destination addresses, count values, etc.) or to insert Header data (e.g., MAC/IP/UDP header information) into the MPEG packet stream.

When the two MSBs (Most Significant Bits) of the address written by the host are both 0, "normal" packet transfer operation is specified whereby packet data is transferred from the DRAM to the MPEG output data port (via multiplexer 1730 and FIFO 1732 ). This "normal" mode is decoded by a gate 1710, which detects a condition where the two MSBs are both zero and there is a (presumably valid) starting address available at the output of the address FIFO 1708 (i.e., the FIFO 1708 is not empty). The gate 1710 produces a DRAM ready (DRAM.RDY) signal that indicates this condition when true. If the two MSBs are both 1, an "insert" mode is specified. This mode is decoded by a gate 1714. An "overlay" mode is specified when the two MSBs in the address FIFO 1708 are 1 and 0. Both "insert" and "overlay" modes negate the DRAM-.RDY signal from gate 1710, which causes a Multiplexer 1730 to select the DRAM address data from the address FIFO 1708 as the source of MPEG packet data presented to an MPEG data FIFO 1732. The insert mode of operation causes data from the address FIFO 1708 to be copied into the MPEG output FIFO 1732 independent of DRAM Data, effectively inserting data into the output stream. By way of contrast, the overlay mode of operation (as controlled by counter 1720, comparator 1722, and gates 1724, 1726, 1728, 1729 and 1718, causes DRAM data to be overwritten by copying values from the address FIFO 1708 to the MPEG output FIFO 1732 while simultaneously clocking out and discarding DRAM output data, effectively overwriting the values from the DRAM. An inverter 1734 off of the MPEG output FIFO's empty status produces an MPEG ready signal (i.e., MPEG data available—FIFO not empty). A gate 1716 decodes the various conditions under which new values are to be clocked out of the address FIFO 1708.

Returning again to FIG. 14, once a critical packet is selected, the host writes its corresponding DRAM address into the first DRAM Output Module 1408. The host processor 1412 can modify the MPEG header of the packet retrieved from DRAM 1402 by specifying overlay mode (see discussion hereinabove). The host processor 1412 specifies overlay mode by setting most significant and second most significant bits of the data word to be substituted for the first word in the MPEG packet to 1 and 0, respectively. Bit values of 1 and 1, respectively select insert mode, whereby the host processor 1412 can insert additional words before each MPEG packet. This is useful for inserting MAC, IP, and UDP headers. When the host processor 1412 is through inserting/overlaying, it clears the two aforementioned most significant bits to resume "normal" operation. The end-of-packet flag DRAM.EOP is asserted when the last word of the packet is retrieved. All output data is stored in FIFO 1732 until received by the TX Mux module.

A second DRAM Output Module 1410 is used to transfer MPEG packets from the DRAM to the Multiplexer output port. In this case, the Multiplexer output port is connected to the input of a Modulator (1018'x', FIG. 10). As with the first DRAM Output Module 1408, packets are selected by the Host by sending DRAM packet addresses to the host input port of the second DRAM Output Module 1410. As before, the MPEG packet headers can be replaced with a modified header by using the DRAM Output Module's overlay mode. In this case, insert mode is not used since there is no need for ethernet or IP framing.

Figure 18:
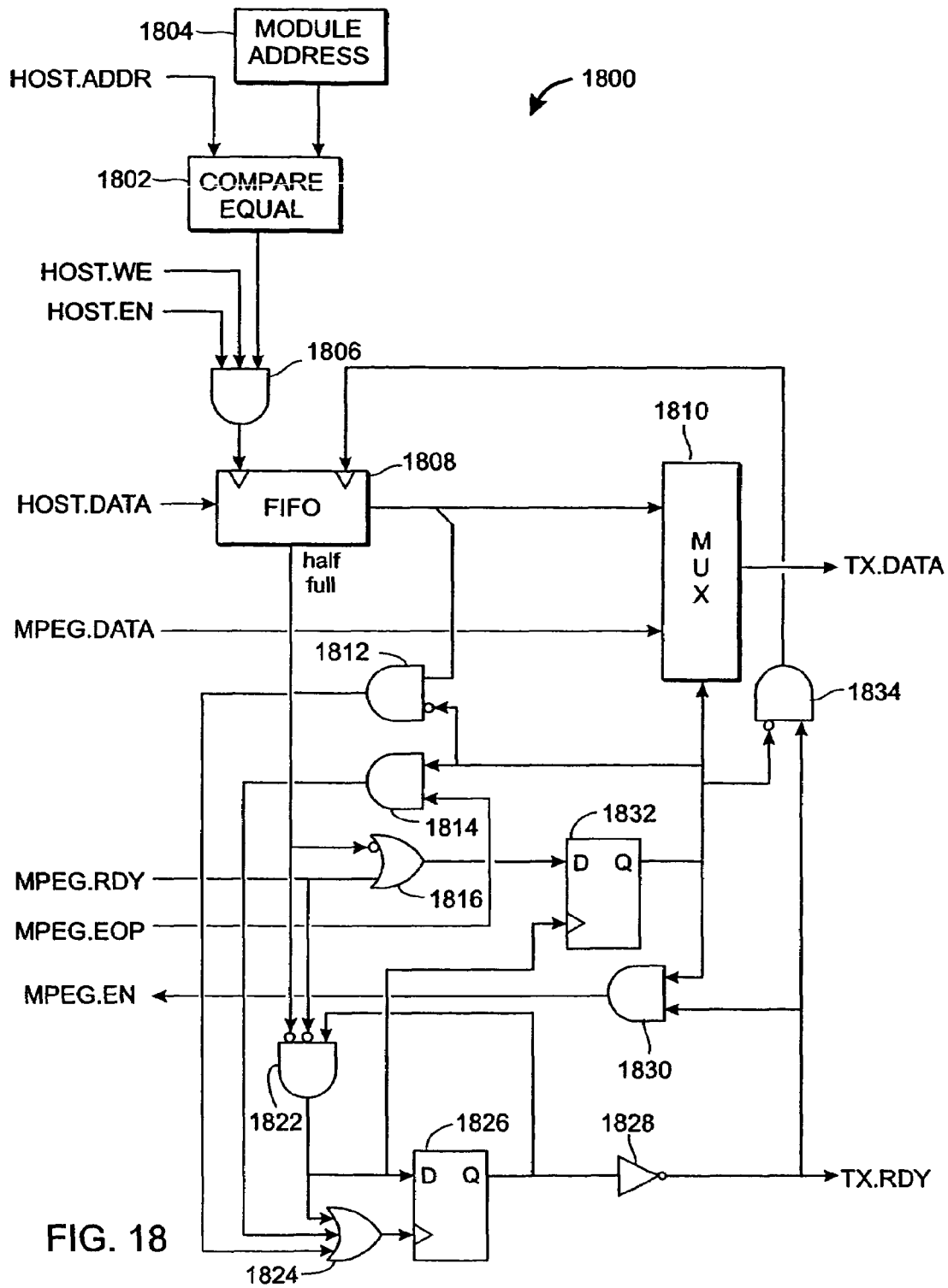
FIG. 18 is a block diagram of a Transmit Multiplexer portion of a network multiplexer, in accordance with the invention.

FIG. 18 is a block diagram of a TX MUX module 1800 (see, e.g., 1418, FIG. 14). The TX MUX module controls data transfers out to the Ethernet PHY interface from either an MPEG port (MPEG.DATA, etc.) or a Host port (HOST-.DATA, etc.). Host data is written into a Host data FIFO 1808 by means of decoding circuitry comprising a comparator 1802 for comparing a host-generated address against a predetermined module address 1804 for the TX MUX module 1800 and a gate 1806 for decoding Host write cycles directed to that address. An output of the gate 1806 causes data on the host data bus to be clocked into the Host data FIFO 1808. A multiplexer 1810 selects whether data is taken from the FIFO 1808 or from the MPEG data stream. Host data is buffered in the FIFO 1808 while higher priority MPEG traffic is being transmitted. Logic circuitry comprising gates 1812, 1814, 1816, 1822, 1824, 1830, and 1834, flip flops 1826 and 1832, and inverter 1828 arbitrates between MPEG and host traffic. Only complete Ethernet frames are transmitted, with the selection of whether Host data or MPEG traffic is to be transmitted next occurring only at Ethernet frame boundaries. MPEG Ethernet frame boundaries are identified by an MPEG EOP (end-of-packet) signal. The data path through the host data FIFO 1808 is one bit wider than the transmitted data, with the extra bit acting as an end of packet marker. This extra bit is normally 0. A logic 1 in this bit identifies the end of a host data packet. Logic gate 1812 detects the end of packet condition when data is being retrieved from the Host data FIFO 1808, and similarly, logic gate 1814 detects the end of packet condition when MPEG data is being transferred. If an end of packet is detected on either source by logic gate 1824, then the next transfer type (Host or MPEG data) is determined by logic gate 1816 and latched by flip flop 1832. Logic gate 1822 detects if there is no further data available from either the MPEG source or the Host data FIFO 1808. Flip flop 1826 registers the output of logic gate 1822 during the interval when no data is available or when an end of packet condition is detected. When data is ready to be transferred, flip flop 1826 outputs a logic 0, thereby causing the TX.RDY output to be asserted by inverter 1828.

Figure 19:
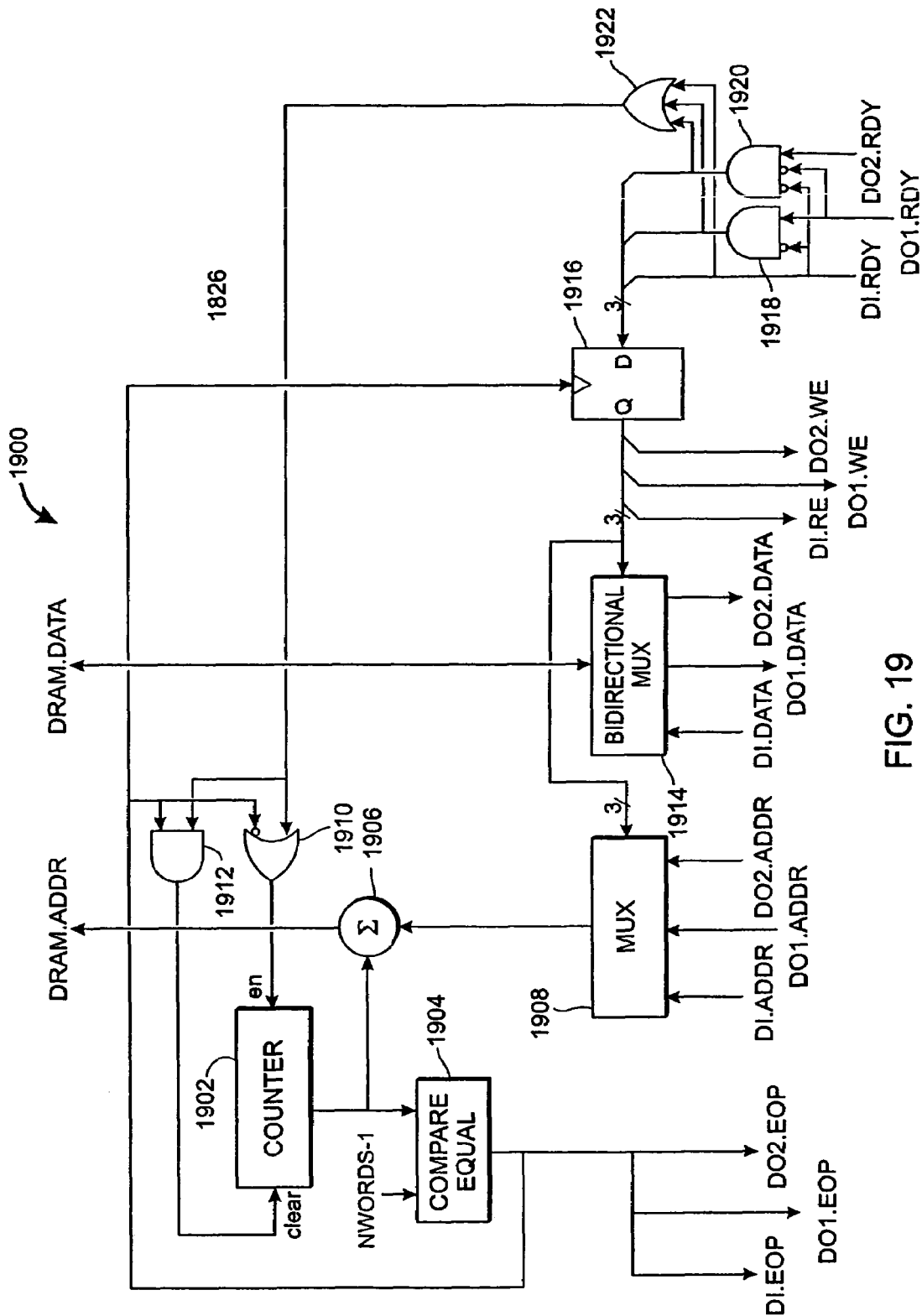
FIG. 19 is a block diagram of a DRAM Interface Module portion of a network multiplexer, in accordance with the invention.

FIG. 19 is a block diagram of a DRAM Interface Module 1900 (see, e.g., 1404, FIG. 14) for controlling data transfer to DRAM (1402, FIG. 14) via a DRAM Input Module (1406, FIG. 4) and from DRAM via either of two DRAM Output Modules (1408, 1410, FIG. 4). As described hereinabove, the starting address for each DRAM data transfer is written to the DRAM Input or Output Module, which presents this address to the DRAM Interface Module 1900. The DRAM Input and Output Modules signal readiness to send data to DRAM or receive data from DRAM via ready signals (DI.RDY, DO1.RDY, DO2.RDY). Priority logic comprising gates 1918 and 1920 give highest priority to data transfers into DRAM from the DRAM Input Module, next highest priority to data transfers from DRAM to a first DRAM Output module (DO1) and lowest priority to data transfers from DRAM to a second DRAM Output module (DO2). A register 1916 synchronizes switching between data transfer types to occur only at packet boundaries (as indicated by an end of packet signal). A gate 1922 enables data transfers whenever any data ready signal (DI.RDY, DO1.RDY, DO2.RDY) is present.

Output signals from the register 1916 are used as selectors for a starting address multiplexer 1908 and a bi-directional data multiplexer 1914. These multiplexers 1908, 1914 select address and data from the DRAM Input Module or the first or second DRAM Output Module, depending upon which is currently identified by the register 1916 as being currently active (being serviced by the DRAM interface module 1900). The starting address for the current transfer is taken from the starting address multiplexer 1908 and provided as an input to a summing block 1906. A counter 1902 increments once for each data transfer to/from DRAM. The counter is cleared (to zero) at the start of each data packet transfer. The output of this counter 1902 is provided as another input to the summing block 1906. The output of the summing block is equal to the sum of the counter value and the selected starting address. This summing block output is used as the DRAM address for data transfers, which starts at the selected starting address and increments by one for each data transfer to/from DRAM. An end-of-packet signal is derived by means of a comparator 1904, which compares the current count value from the counter 1902 with the number of words in the data packet (NWORDS-1) such that the transfer of the last word from any data packet generates produces an end-of-packet signal (DI.EOP, DO1.EOP, DO2.EOP). In the case of MPEG transport packets, NWORDS is equal to 188 divided by the number of bytes per word.

Those of ordinary skill in the art will understand that many of the block diagrams of various functions described herein are highly schematic in nature and should be taken as being generally representative of the functions they describe and not necessarily literal logic representations of specific circuit implementations. Numerous possible variations and alterations are possible to achieve substantially the same end result within the spirit and scope of the present inventive technique.

The remaining functions of the Network Multiplexer are effectively implemented in software running on the Host CPU (1412, FIG. 14). These tasks include managing DRAM memory, selecting MPEG critical packets and instructing the hardware to send these packets to the CA unit for encryption, substituting unencrypted packets with the corresponding encrypted versions when they are received from the CA unit, modifying the MPEG packet stream by editing headers, discarding selected packets, or inserting additional packets to control the operation of the receivers, and determining the sequence and rate in which packets are sent to the modulator or other channel-formatting devices. Of these, software processes specific to the present inventive technique are now described in additional detail.

The task of DRAM memory management is particularly well suited to software implementation. Any suitable memory management strategy can be employed, but one suitable strategy partitions available DRAM memory into a fixed number of segments, with each segment matched to the size of an MPEG packet. Initially the address of each such packet is maintained in a free list. The free list can be very simple. For example, each entry in the free list may include the starting address of the unused packet in DRAM and a pointer to the next packet in the free list. Packets are removed from one end of the list and added to the other. When a packet is allocated to store MPEG data received from the network, an entry is removed from the free list and added to a link list, which maintains the state of each allocated packet, including such information as the starting address of the packet in DRAM, the PID and Continuity Count (CC) parameters (both extracted from the packet header), and a pointer to the next allocated packet in the same stream (i.e. the next packet with the same PID). For each stream, pointers are maintained to the first and last allocated packets. It is also useful to maintain an identifier (tag) with each allocated packet. This identifier is also stored in the link list and is used to positively identify each encrypted packet that is returned from a CA unit.

Figure 20:
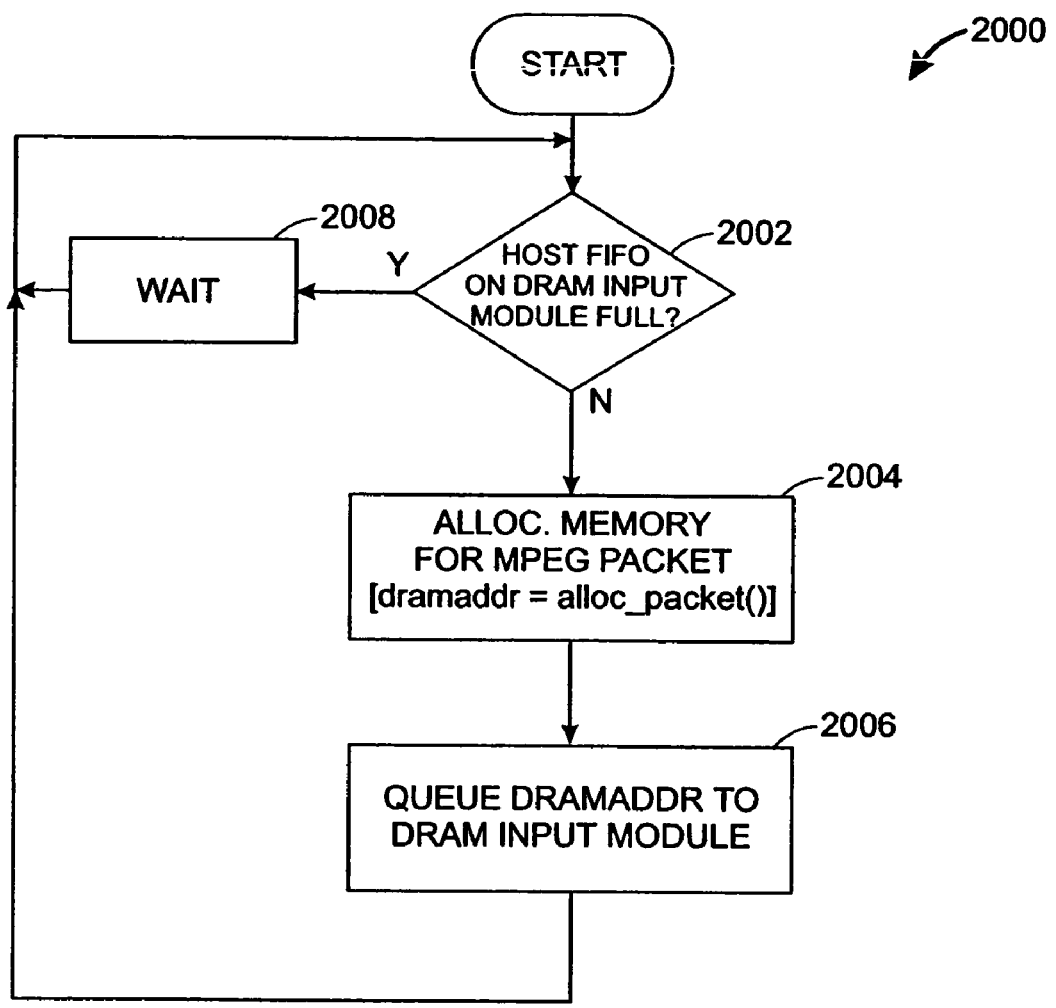
FIG. 20 is a flowchart of a process for allocating memory for incoming MPEG packets, in accordance with the invention.

FIG. 20 is a flowchart 2000 of a DRAM memory allocation process for incoming MPEG packets. In a first step 2002, the process determines if the DRAM input module is ready to transfer packet data (i.e., is the host FIFO 1608, FIG. 16 full). If not, the process loops through a wait step 2008 and the first step 2002 repeatedly until the DRAM Input module is ready. A next step 2004 allocates memory for the packet transfer by "popping" the next available packet address from the free list. A next step 2006 provides this starting address to the DRAM input module via its host interface as described hereinabove. The process is repeated continuously.

Figure 21:
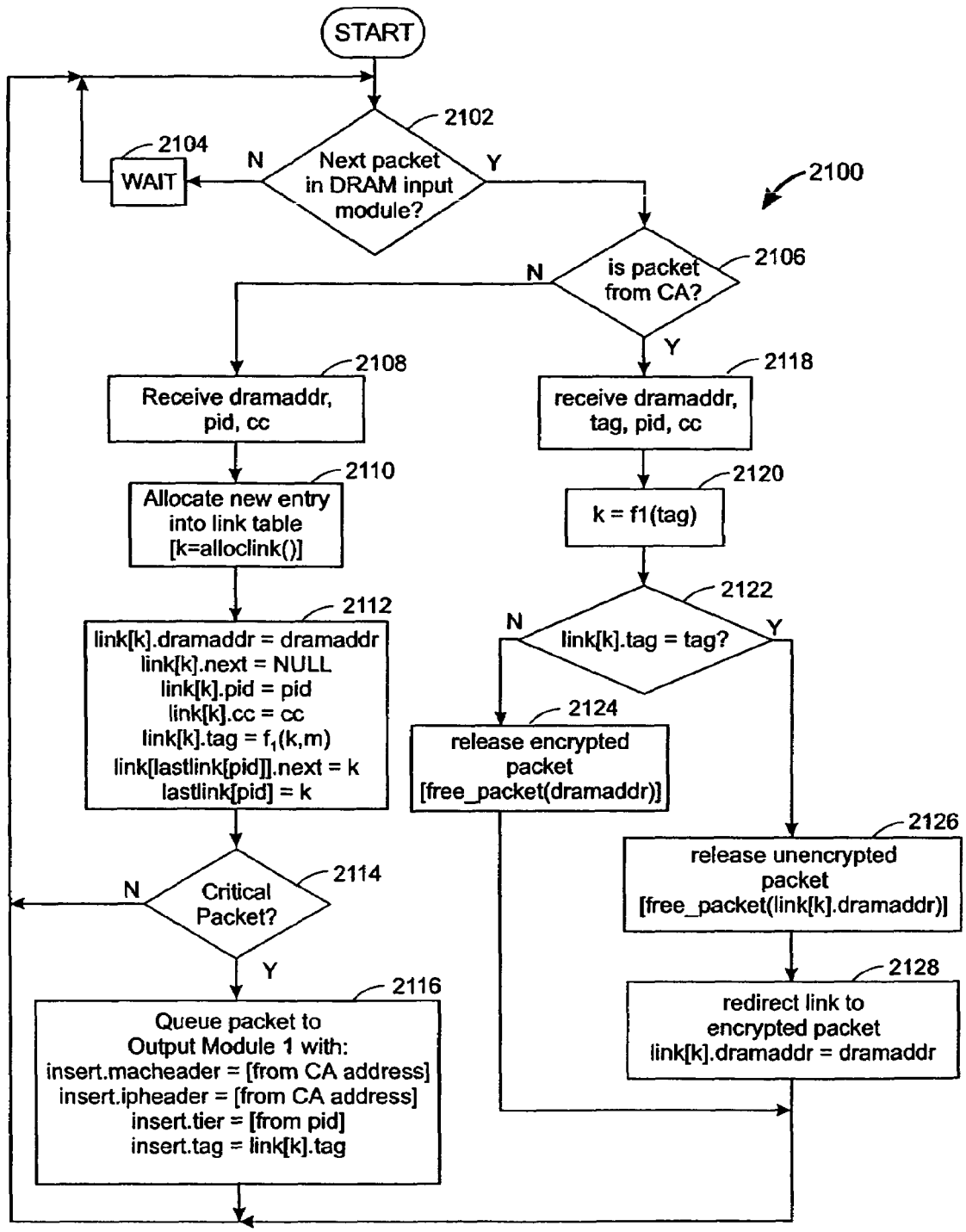
FIG. 21 is a flowchart of a process for receiving and processing of packets detected by the DRAM Input Module, in accordance with the invention.

FIG. 21 is a flowchart 2100 of a process for receiving and processing packets via the DRAM Input Module. The process is started by determining in a first step 2102 whether a new packet is available for transfer from the DRAM input module. If not, the process waits (steps, 2104, 2102) until a packet is available. As described hereinabove, each time a new packet is received from the DRAM Input module, a copy of its header data is stored and made accessible to the host process via the host bus interface on the DRAM Input Module. A next step 2106 then determines if the packet is an encrypted packet being returned from a CA unit. If not, this is a new packet, and a next step 2108 retrieves the DRAM address for the transfer and the packet's PID and continuity count (CC). A next step 2110 creates a new link list entry and stores the DRAM address, PID and CC there. A next step 2112 links the previous packet of the same stream to this new packet, and a pointer to the last packet of the stream is also adjusted to point to the new packet. A tag is also generated and associated with this packet. It is generated as a function (f1) of the link table entry (k) and an additional parameter (m) that is representative of the contents of the packet. As an example, m could be computed as a hash function of a portion of the received packet. A constraint is that there must be a corresponding function (f2) which can restore the link table entry (k)

A next step 2114 determines if the packet is a "critical" packet. This determination can be made using the methods described in UNGER in combination with buffer fullness information received from the latest status packet from Network CA Formatter (FIGS. 10, 11). If it is determined that the packet is critical, then in a next step 2116, the packet is queued in the first DRAM Output Module's FIFO (FIGS. 14, 17), to be sent to a CA unit for encryption. The insert mode of the DRAM Output Module is used to insert an ethernet MAC, IP, and UDP header. Tag and Tier parameters are also inserted in the same way. As described hereinabove, the Tag parameter conveys both a packet identifier and the position of the packet in the link list. This tag is associated with each table address k and is used to verify the authenticity of a packet when it is returned from the CA unit in encrypted format. Once the link table has been updated, the host can send the ethernet frame immediately, or wait until seven packets of the same stream have been accumulated (as shown and described hereinabove with respect to FIG. 12).

If the packet is an encrypted packet being returned from a CA unit, then it is first necessary to confirm that there is proper correspondence with the unencrypted version of the packet (which should still exist in DRAM). This is done by first receiving the DRAM address of the incoming packet and extracting its tag value, PID and continuity count (step 2118), then determining the link table address from the tag value (step 2120). Next, the tag value is compared against the tag value stored in the link table (step 2122). If they match, the unencrypted packet is released (step 2126) and replaced by the encrypted packet (step 2128). If the tag in the link table does not match the tag recovered from the received packet (meaning that the DRAM packet does not correspond to the incoming encrypted packet) then the encrypted packet is discarded (step 2124).

The tag that is stored with the unencrypted version at link table location k should match the tag derived from the received encrypted packet. However, if the encrypted packet was delayed, either due to a problem with the CA unit, the Network CA Formatter, or the network, then the packet may no longer be useful. For example, the multiplexer can be designed such that it will not wait for a critical packet that has been delayed during the process of encryption. Instead, it will choose to send the unencrypted version of the packet (which still exists in DRAM). When this happens, the unencrypted packet is released from DRAM, and if the encrypted packet eventually arrives, the tag verification test will fail, in which case the returning encrypted packet is simply discarded by returning its DRAM space to the free list. Consequently, encryption failures or encryption delays may lead to a loss of some security but not to a loss of service.

If an encrypted packet is returned to the multiplexer and the tag verification test proves valid, then the encrypted packet will be substituted for the unencrypted version. This substitution is implemented simply by modifying the entry at position k of the link table in order to point to the DRAM address of the encrypted packet in place of the DRAM address of the unencrypted packet. The unencrypted packet is no longer needed and can now be returned to the free list.

Attention is now directed to the process of transmitting selected packet out of the Network Multiplexer to a modulator. The location of each selected packet in the link list can be identified by referencing a pointer that marks the beginning of the stream, where the stream is determined by the PID. The host maintains such a pointer for each valid stream. Once the proper link list entry has been identified, the packet can be queued for transmission by sending the corresponding DRAM address to FIFO 1708 of DRAM Output Module 2 (FIG. 17). The output module's overlay mode can be used to correct the MPEG packet header, particularly the MPEG PID and the Continuity Count (CC) parameters. This is necessary in the case of critical packets, as the proposed Network CA Formatter causes the PIDs and Continuity Counts to be modified before packets are sent to the CA unit, and no attempt is made to restore these parameters once the packets are returned. However, these parameters are preserved in the link list table and can be used to override the parameters that are included in the version that exists in DRAM. Ideally, the Host would maintain the entire MPEG header in the link list and overlay the entire header when the packet is transmitted. However, the transport_scambling_control field of the MPEG header should not be overridden. This field is set by the CA unit and specifies one of two decryption keys that must be applied for proper decryption. This field should not be changed by the multiplexer or the decryption process will fail.

Once the packet has been queued for transmission to the modulator, the pointer which marks the beginning of the stream is advanced in order to point to the next packet with the same MPEG PID. The tag that is associated with this particular link table address is also changed at this time. This is to ensure that any corresponding encrypted packet subsequently received from the CA unit will fail the packet tag verification test in (step 2122, FIG. 21). For example, the tag may be updated by incrementing the previous tag by one. Finally, the packet can be returned to the free list and subsequently reused pending completion of the transfer from the DRAM to the output of the multiplexer.

Figure 22:
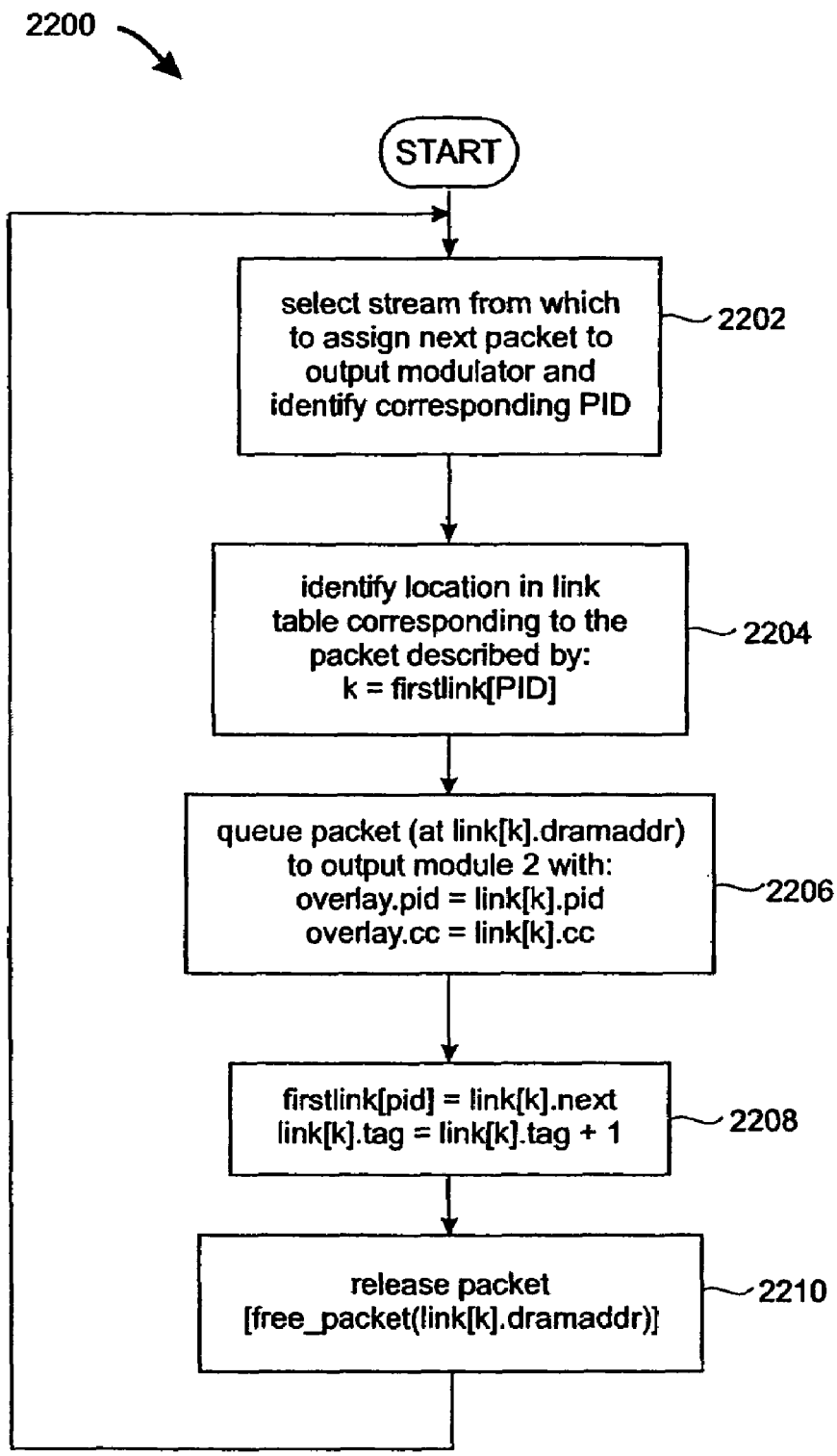
FIG. 22 is a flowchart of a process for handling selected packets, in accordance with the invention.

FIG. 22 is a flowchart 2200 of this process for handling packets that are selected for transmission via a modulator. In a first step 2202, then stream from which the next packet will come is identified and its PID is determined. In a next step 2204, the link table location for the packet is identified as the first packet in the list for that PID. A next step 2206 queues the packet for transmission to the modulator via the second DRAM output module. A next step 2208 updates the "first packet" pointer for the stream (identified by PID) to point to the next packet in the list. A next step 2210 frees the packet once it has been transmitted. The process then repeats.

The host can also effect transitions of programs from one encryption channel to another. For example, if feedback (in the form of Status Packets originating from the Network CA Formatter) indicates that a first encryption channel is experiencing very high traffic and the critical packet threshold has already been raised beyond a predetermined "comfortable" limit, then a second encryption channel may be initialized. The channel may be initialized on any CA unit capable of accepting additional traffic and an additional channel definition. In order to insure compatibility with the authorization state of the receivers, the second channel must be configured using the same tier information that was used to configure the first encryption channel. Once the second encryption channel has been created and is online, one or more programs can be transition from the first channel to the second, but the transition must be carefully synchronized to avoid service discontinuities. Synchronization is important because decryption keys generated and embedded in ECM packets on one encryption channel will not be compatible with the packets that are encrypted and conveyed in a second encryption channel. The synchronization problem is further complicated by the fact that there are usually two distinct ECM packets generated within each channel, and both are repeated at regular intervals. One of the ECMs contains the valid key for the current epoch (interval) and the other ECM contains the valid key for the next epoch. The ECM for the next epoch is always provided in advance in order to allow the receiver time to decrypt the message and extract the key that will be needed when the transition to the next epoch occurs. In practice, the receiver simply maintains two active keys, and updates the corresponding key each time one of the ECM messages is changed. The receiver also examines the transport_scrambling_control parameter that is embedded within each MPEG packet header. This parameter indicates if the packet is encrypted, and if so, which of the two keys should be applied.

Figure 23:
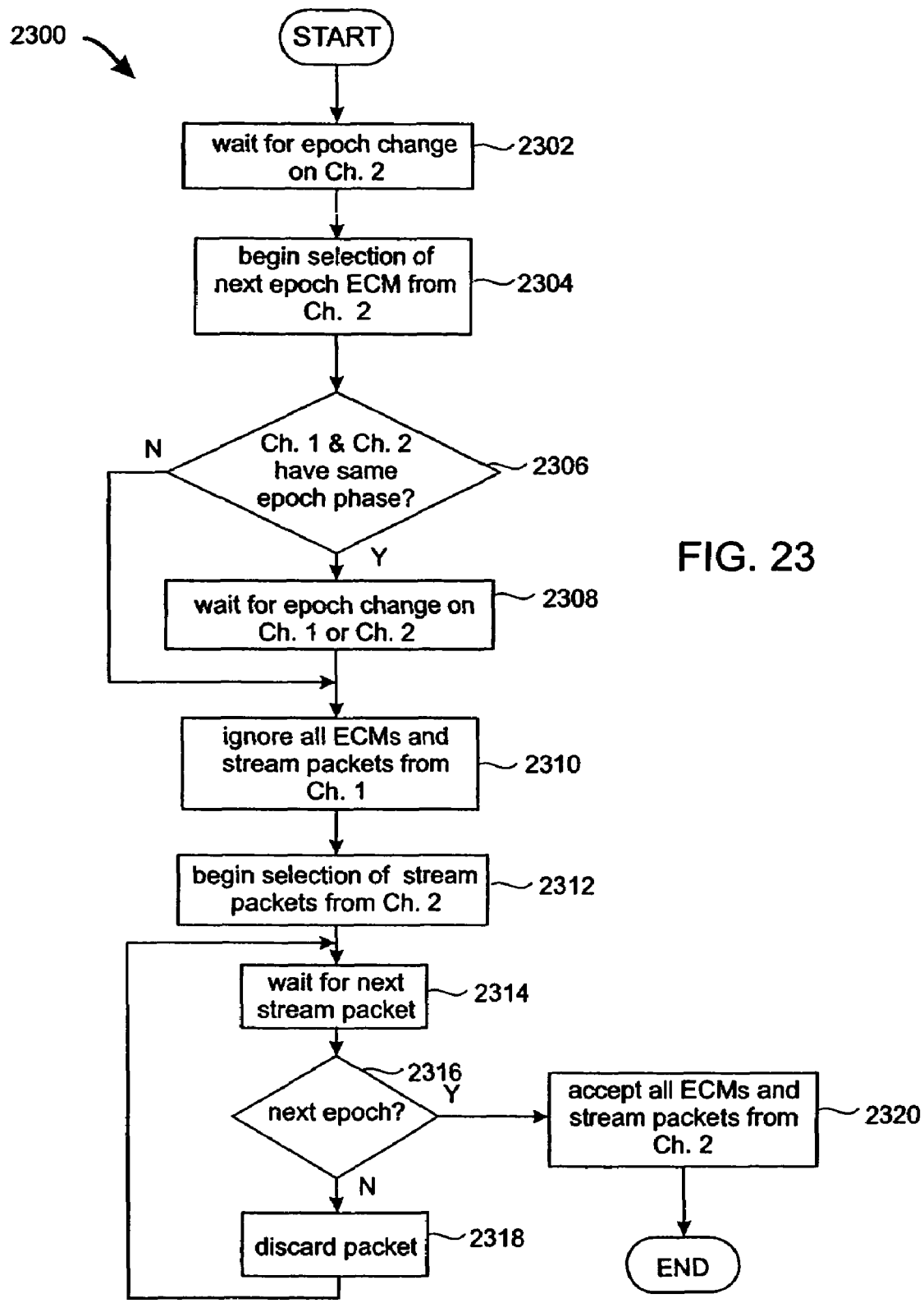
FIG. 23 is a flowchart of a process for transitioning between encryption channels, in accordance with the invention.

FIG. 23 is a flowchart 2300 of a suitable process for transitioning a program from a first encryption channel to a second encryption channel. In this process, a first step 2302 waits for an epoch change (change of encryption key) on the second channel (channel 2). A next step 2304 begins selection of the ECM (Entitlement Control Message) for the next epoch on the second channel. A next step 2306 determines whether the first and second encryption channels have the same epoch phase. If they do, a next step 2308 waits for an epoch change on either channel. If not, the next step 2308 is skipped. A next step 2310 ignores all ECMs and stream packets from the first encryption channel. A next step 2312 begins selection of stream packets from the second encryption channel. A next step 2314 waits for the next stream packet. A next step 2316 synchronizes to the next epoch change, receiving and discarding packets (steps 2314, 2318) until the change occurs, at which point a final step completes the switchover to the second encryption by accepting all ECMs and stream packets from the second channel.

Figure 24A:
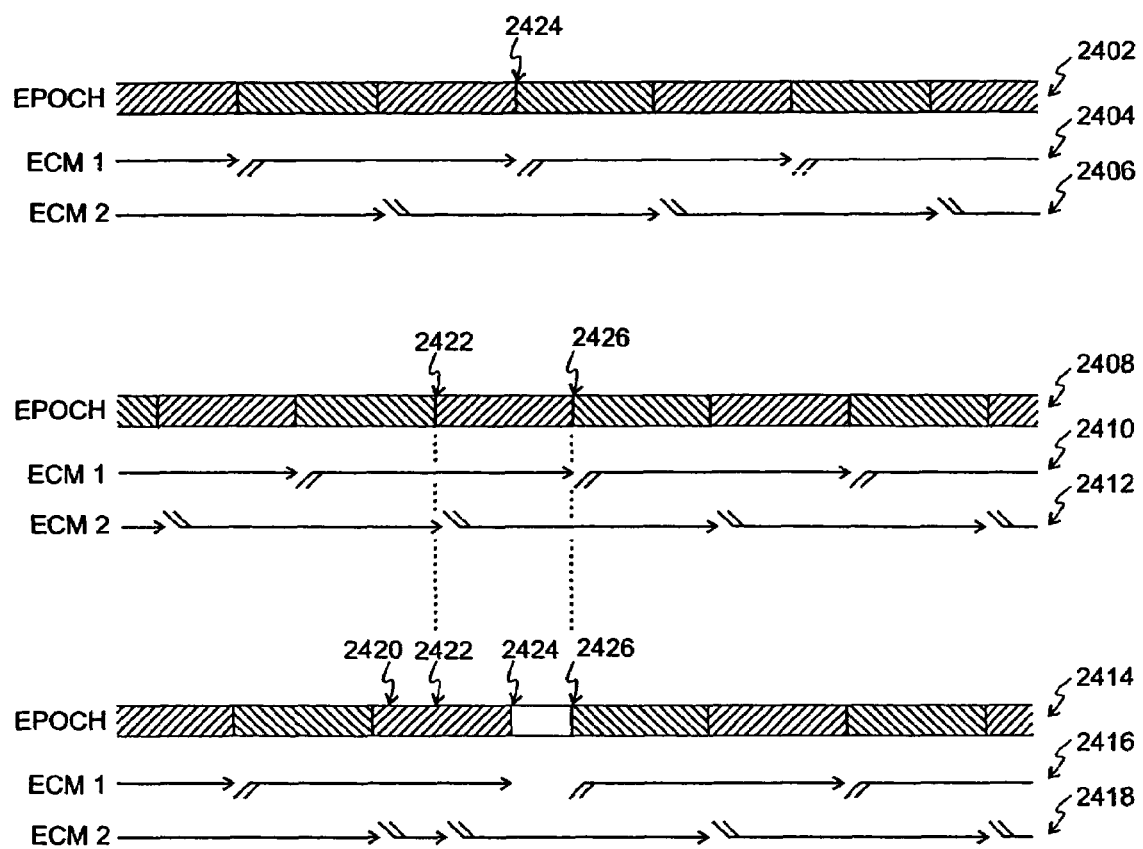
FIG. 24A is a diagram illustrating a first example of transitioning between encryption channels, in accordance with the invention.
Figure 24B:
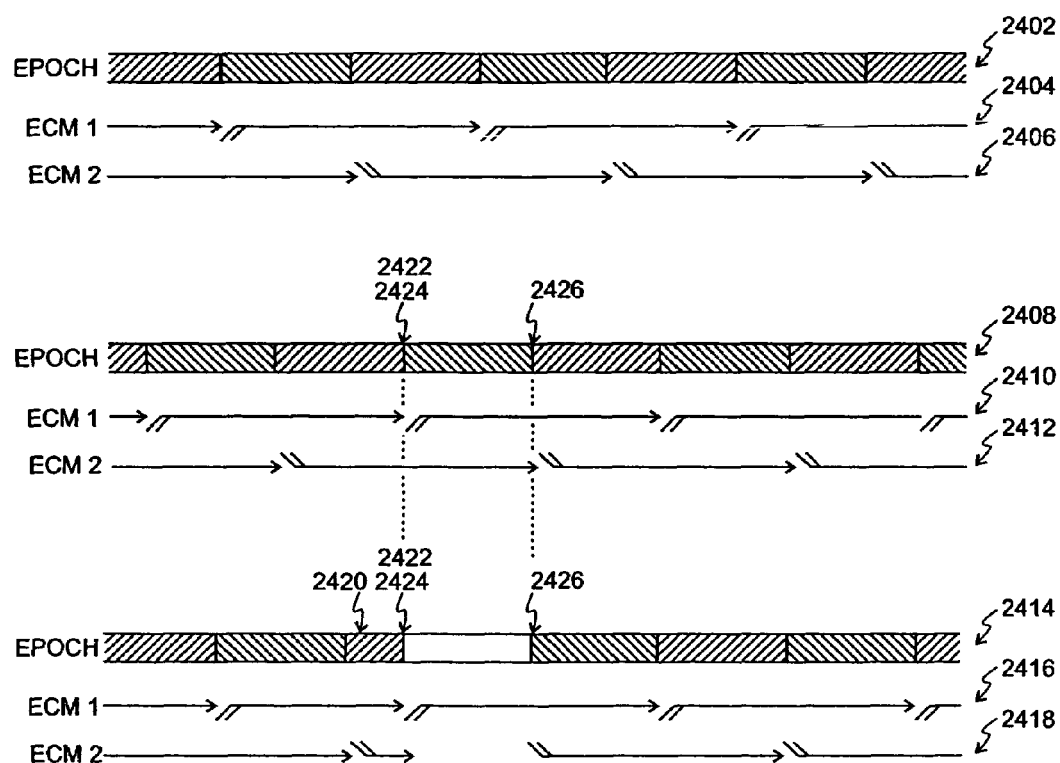
FIG. 24B is a diagram illustrating a second example of transitioning between encryption channels, in accordance with the invention.

FIGS. 24A and 24B are timeline diagrams illustrating transitions from a first encryption channel to a second encryption channel. The examples shown in the Figures are similar, but illustrate slightly different sequences of events. Because of their similarities, both Figures are considered simultaneously in the discussion below. In both Figures, the epoch intervals are distinguished by diagonal lines in one of two directions. During each epoch, only one of the two ECMs is needed to derive the key that can be applied to all encrypted packets. When a transition occurs and the next epoch becomes the current epoch, this particular ECM is no longer needed and is replaced by the ECM that will be needed for the next epoch after this one. In both Figures, the timing of the programs included in the first encryption channel is represented by epoch intervals 2402, first ECM 2404, and second ECM 2406. The timing of the programs included in the second encryption channel is represented by epoch intervals 2408, first ECM 2410, and second ECM 2412. An example where a program is transitioned from the first encryption channel to the second encryption channel is described by epoch intervals 2414, first ECM 2416, and second ECM 2418. Within each Figure, all timelines are horizontally aligned such that a vertical line drawn through the Figure intersects all timelines at the same instant of time.

In FIG. 24A and FIG. 24B, the decision to transition a program from the first encryption channel to the second encryption channel is made at instant 2420 on the epoch timeline. The first step is to wait until the next epoch transition occurs in encryption channel 2 (instant 2422). At this time the ECM corresponding to the next epoch on channel 2 is swapped in place of the corresponding ECM from channel 1 of the same phase. Note that this is the second ECM (2418) in the example of FIG. 24A and the first ECM (2416) in the example of FIG. 24B. Also at this time, the phase of the new current epoch on channel 2 is compared with the phase of the current epoch on channel 1. If both channels have the same phase, then the process is delayed until an epoch change occurs on either of the two channels, thereby causing the epoch phases to differ. Note that this processing delay occurs in the example of FIG. 24A but does not occur in the example of 24B.

Once the two channels have opposite epoch phases (instant 2424), the remaining ECM and all encrypted packets from the first channel are now entirely ignored. However, it is too early to begin sending encrypted packets from the second channel since the ECM for this epoch has not yet been sent to the receiver. If it had been sent earlier, then it would have conflicted with the ECM that was essential for decoding the encrypted packets that were still originating from the first channel. One could choose to begin sending the ECM for the current epoch of the second channel immediately (after instant 2424), however, one must still wait until the receiver has had time to decrypt this ECM before any encrypted packets can be sent. If there is a miscalculation and an encrypted packet is sent before a particular receiver has had time to derive a valid key, then the packet will not be decrypted and an error will occur. In this particular implementation, such errors are effectively prevented by continuing to discard all encrypted packets until the next epoch transition occurs on the second channel (instant 2426). All ECMs and encrypted packets are then accepted from the second channel and the transition is complete.

It should now be realized that if the invention is implemented using the methods that have been described with respect to this particular embodiment, then the multiplexer will automatically choose to send the unencrypted version of each missed packet during the interval from 2424 to 2426. Consequently, the transition will remain seamless and the presentation to the viewer will not be disrupted. However, if one prefers, there are numerous ways to reduce or eliminate the interval during which packets are sent in unencrypted form. For example, if the phase of a particular ECM is readily accessible and is not buried within the encrypted portion of the message, then it may be toggled in order to avoid conflicting with an ECM from the first channel. In this case, the transport_scrambling_control parameters of subsequent encrypted packets must also be toggled in order to maintain the proper ECM correspondence.

The present invention has been described in terms of a separate multiplexer and Network CA Formatter. However, those of ordinary skill in the art will immediately understand that the the Network Multiplexer as illustrated in FIG. 14 and described in detail above, is particularly well suited to incorporation of the Network CA Formatter functions. To minimize the amount of network traffic, the number of system components, and the combined costs of these components, the functions of the Network CA Formatter can be combined with the functions of the Network Multiplexer. If a particular system includes more than one multiplexer unit and more than one CA unit, then it may be advantageous to associate one or more CA units with a single multiplexer. If other multiplexers desire access to said one or more CA units, then the first multiplexer can serve as a proxy. Similarly, if the first multiplexer needs access to a CA unit that is associated with a second multiplexer, then the second multiplexer can serve as a proxy.

Although the invention has been shown and described with respect to a certain preferred embodiment or embodiments, certain equivalent alterations and modifications will occur to others skilled in the art upon the reading and understanding of this specification and the annexed drawings. For example, the Network CA Formatter can be combined with the Receiver or other networked component, or the Network CA Formatter can be combined with the CA unit. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A system for time-multiplexed, multi-program encryption, comprising:
   at least one receiver for receiving and decoding at least one multiplex stream containing one or more programs;
   critical packet identification means for identifying selected packets of said at least one multiplex stream to be encrypted;
   at least one conditional access unit for encrypting selected packets of said at least one multiplex stream;
   at least one multiplexer for directing said selected packets to said at least one conditional access unit for encryption, receiving said selected encrypted packets from said at least one conditional access unit and combining said selected encrypted packets and unencrypted packets into one or more output streams;
   means for overriding and restoring parameters of said selected packets; and
   wherein said unencrypted packets in said at least one multiplex stream are replaced with said selected encrypted packets corresponding to said unencrypted packets.

2. A system according to claim 1, further comprising:
   means for reformatting packets sent to and received from said at least one conditional access unit.

3. A system according to claim 1, further comprising:
   means for combining selected packets from multiple programs into a single stream and tagging said selected packets according to their source program;
   means for encrypting the single stream under a common encryption tier; and
   means for separating the encrypted packets according to tag values and replacing corresponding unencrypted packets in the multiple programs with the encrypted packets.

4. A system according to claim 1, further comprising:
   means for transmitting unencrypted critical packets in place of said selected encrypted packets in the event of an encryption failure.

5. A system according to claim 4, further comprising:
   means for discarding encrypted packets for which a corresponding unencrypted packet cannot be identified.

6. A system according to claim 4, further comprising:
   means for transmitting unencrypted critical packets in place of encrypted packets in the event of an excessive encryption delay; and
   means for discarding encrypted packets received after a corresponding unencrypted packet has already been transmitted.

7. A system according to claim 1, further comprising:
   means for sharing a single ECM among multiple programs in a single encryption tier when packets from said multiple programs are combined into a single multiplex stream.

8. A system according to claim 1, further comprising:
   for each encryption tier, means for monitoring and indicating a rate at which packets are being encrypted;
   means responsive to said rate indication for adjusting critical packet threshold selection criteria to match said rate; and
   means for dropping critical packets that cause encryption capacity to be exceeded.

9. A system according to claim 1, further comprising:
   for at least one encryption tier, means for monitoring and indicating a rate at which packets are being encrypted;
   means responsive to said rate indication for allocating an additional encryption channel on an available conditional access unit and initializing said additional encryption channel to the encryption tier for which said rate indication is made; and means for transitioning one or more programs to said additional encryption channel.

10. A system according to claim 1, further comprising:

for at least one encryption tier, means for monitoring and indicating a rate at which packets are being encrypted, where at least two encryption channels are active for the same encryption tier;

means responsive to a low rate indication for transitioning programs from at least one of said encryption channels to combine them onto another encryption channel active for the same encryption tier; and means for making the encryption channel from which programs were transitioned available for reallocation to another encryption tier.

11. A system according to claim 1, further comprising:

for each encryption tier for which two or more encryption channels are active, means for monitoring critical packet selection rates for each of said channels and transitioning programs between encryption channels to maintain a utilization balance therebetween.

12. A system according to claim 1, further comprising:

for each conditional access unit:
  means for monitoring and indicating a critical packet selection rate; and
  means responsive to said rate indication for adjusting critical packet selection criteria to maintain a desired critical packet selection rate.

13. A system according to claim 1, further comprising:

means for communicating between said conditional access units and multiplexers via a common network.

14. A method for time-multiplexed, multi-program encryption, comprising:

receiving and processing streams corresponding to multiple programs;

selecting critical packets from the multiple programs and combining them into at least one encryption stream;

providing said encryption stream to a conditional access unit for encryption, said conditional access unit producing a corresponding encrypted stream; and separating packets in said encrypted stream and replacing corresponding packets of said multiple programs with said encrypted packets.

15. A method according to claim 14, further comprising:

detecting encryption failures and delays, and transmitting corresponding unencrypted packets in place of encrypted packets when such failures and delays occur.

16. A method according to claim 14, further comprising:

discarding encrypted packets for which an association with a corresponding unencrypted packet cannot be confirmed.

17. A method for time-multiplexed, multi-program encryption, comprising:

receiving and processing streams corresponding to multiple programs;

selecting and tagging critical packets from the multiple programs and combining them into at least one encryption stream;

providing said encryption stream to a conditional access unit for encryption, said conditional access unit producing a corresponding encrypted stream;

separating packets in said encrypted stream according to tag values and replacing corresponding packets of said multiple programs with said encrypted packets;

for at least one encryption tier, monitoring a critical packet generation rate and generating an indication thereof; and transitioning programs from one encryption channel to another in response to said packet generation rate indication.

18. A method according to claim 17, further comprising:

in response to a high critical packet generation rate, initializing an additional encryption channel for encryption on the same encryption tier and transitioning critical packets for one or more programs to the additional encryption channel.

19. A method according to claim 17 wherein:

at least two encryption channels are active at the same encryption tier, said method further comprising:
  in response to a low critical packet generation rate, transitioning all programs from a first encryption channel to a second encryption channel active at the same encryption tier; and
  making the first encryption channel available for reallocation to another tier.

20. A method according to claim 17 wherein:

at least two encryption channels are active at the same encryption tier;

said method further comprising:
  adjusting critical packet threshold selection criteria to maintain a balance in encryption rates between the at least two encryption channels.

* * * * *

UNITED STATES PATENT AND TRADEMARK OFFICE
CERTIFICATE OF CORRECTION

PATENT NO. : 7,590,237 B2  
APPLICATION NO. : 11/094865  
DATED : September 15, 2009  
INVENTOR(S) : Krause et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Twenty-first Day of September, 2010

David J. Kappos  
*Director of the United States Patent and Trademark Office*